United States Patent
Takushima et al.

(10) Patent No.: US 9,366,876 B2
(45) Date of Patent: Jun. 14, 2016

(54) LENS COMPONENT AND IMAGE DISPLAY DEVICE

(75) Inventors: Michiko Takushima, Yokohama (JP); Tomomi Sano, Yokohama (JP); Jun Yorita, Osaka (JP); Masaya Nishi, Osaka (JP)

(73) Assignees: Sumitomo Electric Industries, Ltd., Osaka-shi (JP); Sumitomo Electric Fine Polymer, Inc., Sennan-gun (JP)

( * ) Notice: Subject to any disclaimer, the term of this patent is extended or adjusted under 35 U.S.C. 154(b) by 82 days.

(21) Appl. No.: 14/118,514

(22) PCT Filed: May 17, 2012

(86) PCT No.: PCT/JP2012/062666
§ 371 (c)(1),
(2), (4) Date: Jan. 17, 2014

(87) PCT Pub. No.: WO2012/157707
PCT Pub. Date: Nov. 22, 2012

(65) Prior Publication Data
US 2014/0126050 A1    May 8, 2014

(30) Foreign Application Priority Data
May 19, 2011  (JP) ................. 2011-112291

(51) Int. Cl.
*G02B 27/22*     (2006.01)
*G02B 3/00*      (2006.01)
(Continued)

(52) U.S. Cl.
CPC .......... *G02B 27/2214* (2013.01); *G02B 3/0037* (2013.01); *G03B 35/24* (2013.01); *H04N 13/0404* (2013.01)

(58) Field of Classification Search
CPC .............................. G02B 27/22; G02B 3/0037
USPC ................................................... 359/463, 626
See application file for complete search history.

(56) References Cited

U.S. PATENT DOCUMENTS 3,565,733 A * 2/1971 Leach ........................... 359/626
5,712,732 A * 1/1998 Street ............................ 359/630
(Continued)

FOREIGN PATENT DOCUMENTS

CN   201045629 Y    4/2008
JP   H0529590 A     2/1993
(Continued)

OTHER PUBLICATIONS

International Search Report in PCT International Application No. PCT/JP2012/062666, dated Aug. 28, 2012.
(Continued)

*Primary Examiner* — Jordan Schwartz
*Assistant Examiner* — George G King
(74) *Attorney, Agent, or Firm* — Venable LLP; Michael A. Sartori; Trent B. Ostler

(57) ABSTRACT

A lens component 10 comprises K unit lenses 11, each extending in the X direction and having a common structure, arranged in parallel at a minimum period $P_L$ in the Y direction. Each unit lens 11 includes two partial lenses $12_1$, $12_2$ sectioned within the minimum period $P_L$ in the Y direction and a flat part 13 disposed between the partial lenses $12_1$, $12_2$. The partial lenses $12_1$, $12_2$ have respective optical axes different from each other but parallel to the Z direction and form images of a common point on an object surface onto an image surface A at respective positions different from each other.

9 Claims, 44 Drawing Sheets

(51) Int. Cl.
  *H04N 13/04* (2006.01)
  *G03B 35/24* (2006.01)

(56) References Cited

U.S. PATENT DOCUMENTS

| | | | |
|---|---|---|---|
| 6,369,949 B1* | 4/2002 | Conley | 359/619 |
| 2006/0056034 A1* | 3/2006 | Tsuruma | 359/626 |
| 2008/0094718 A1* | 4/2008 | Osaka et al. | 359/626 |
| 2009/0168187 A1* | 7/2009 | Woodgate et al. | 359/623 |
| 2012/0268816 A1* | 10/2012 | Bae et al. | 359/463 |

FOREIGN PATENT DOCUMENTS

| | | |
|---|---|---|
| JP | H07270602 A | 10/1995 |
| JP | 09-026503 | 1/1997 |
| JP | 2004-234017 A | 8/2004 |
| JP | 2005-196139 A | 7/2005 |
| JP | 2006-178371 A | 7/2006 |
| JP | 2007-155947 A | 6/2007 |
| JP | 2008-134617 A | 6/2008 |
| JP | 2009-163905 A | 7/2009 |
| JP | 2009-222903 A | 10/2009 |
| JP | 2010-181610 A | 8/2010 |
| JP | 2011-028080 A | 2/2011 |
| JP | 4728454 B1 | 7/2011 |
| JP | 2011-186431 A | 9/2011 |
| WO | WO-2011/034219 A1 | 3/2011 |

OTHER PUBLICATIONS

International Preliminary Report on Patentability and Written Opinion in PCT International Application No. PCT/JP2012/062666, dated Nov. 28, 2013.

Notification of First Office Action in Chinese Patent Application No. 201280023209.9, dated Oct. 30, 2014.

Notice of Reasons for Rejection in Japanese Patent Application No. 2011-112291, dated Apr. 7, 2015.

* cited by examiner

Fig.10
(a)
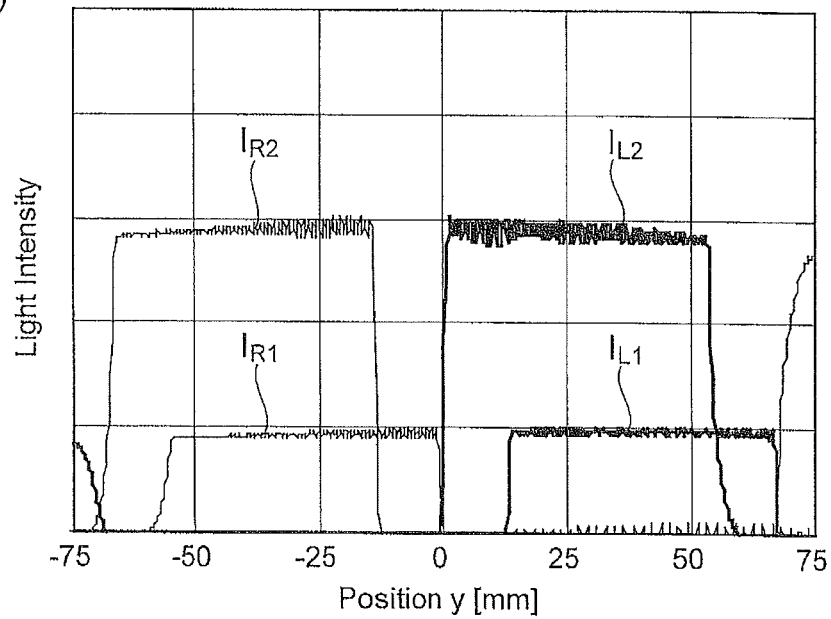
(b)
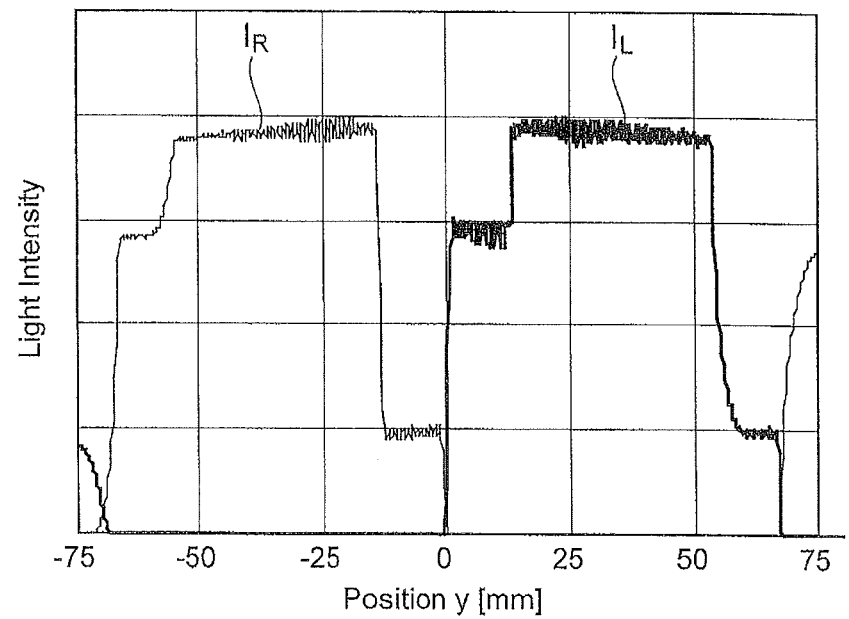

Fig.18
(a)
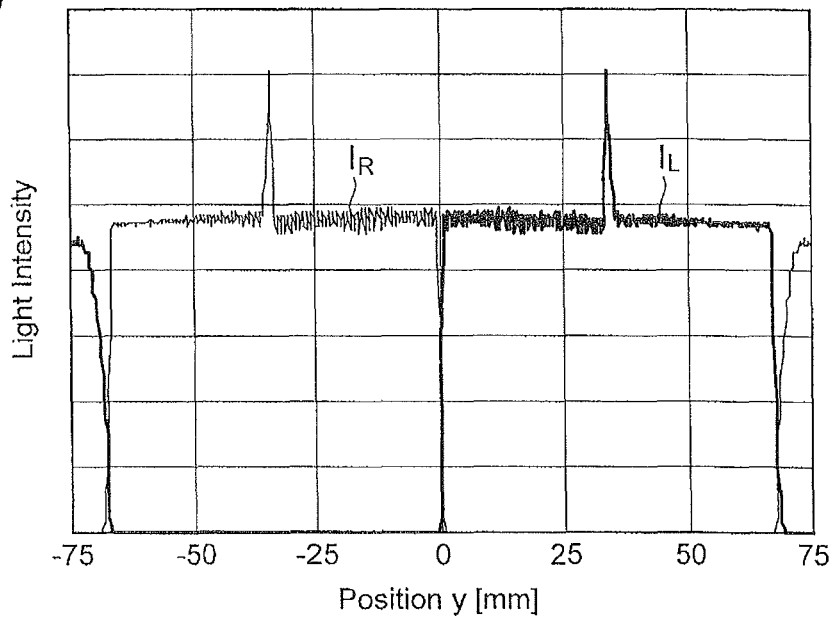
(b)
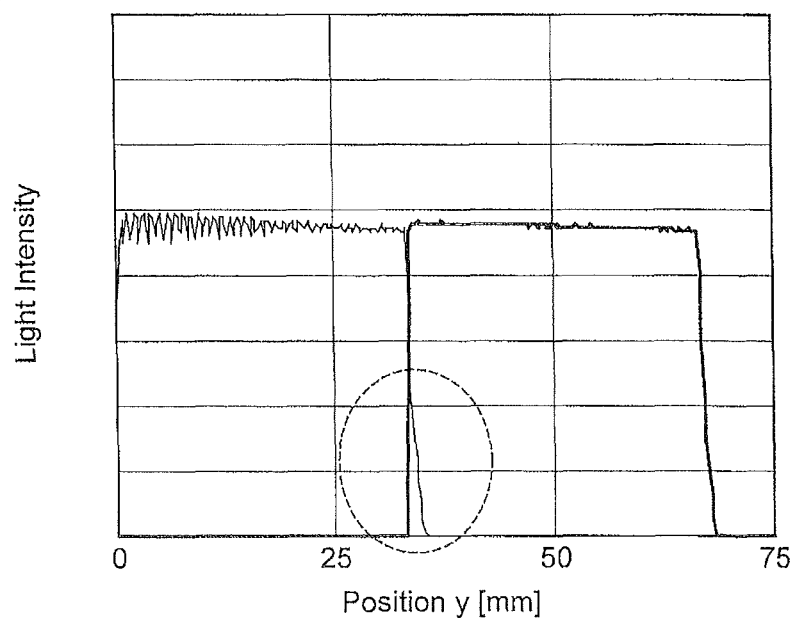

Fig.44
(a)
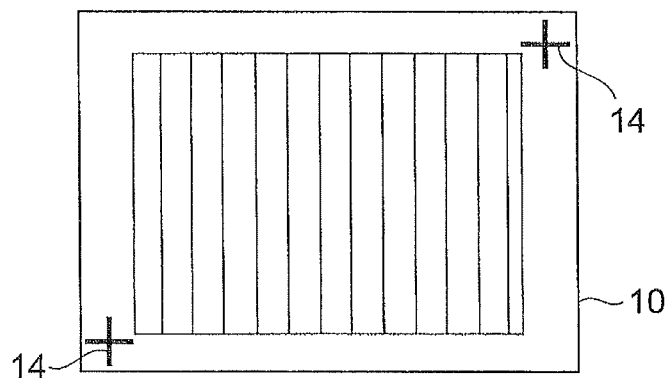
(b)
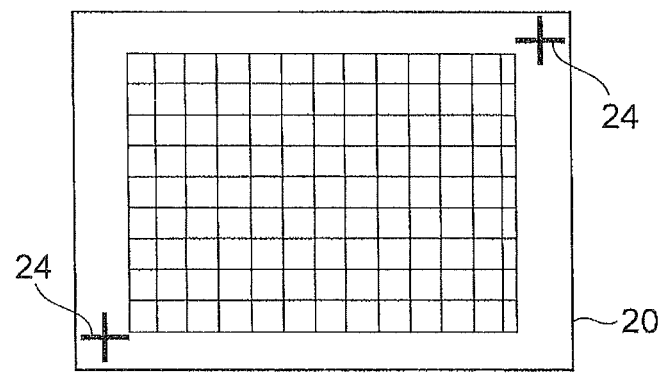

LENS COMPONENT AND IMAGE DISPLAY DEVICE

TECHNICAL FIELD

The present invention relates to an image display device capable of displaying images respectively to a plurality of viewpoints and a lens component included in the image display device.

BACKGROUND ART

An image display device capable of displaying images respectively to a plurality of viewpoints can display images different from each other to respective persons sat on driver's and passenger seats in a car navigation system, for example. The image display device can also display images different from each other to the right and left eyes of the same person, thereby making them recognized as a three-dimensional image.

Known as such an image display device is one comprising a display panel using a liquid crystal or the like and a lenticular lens in which cylindrical lenses are arranged in parallel. When a liquid crystal display panel is used as the display panel, a shielding region called black matrix surrounds each pixel. Since the shielding region exists between pixels in the display panel, a black area corresponding to the shielding region occurs on an image surface where the image display device displays images.

The black area may be recognized depending on its position on the image surface, so as to be observed as a black streak, which lowers the image quality. Hence, the invention disclosed in Patent Literature 1 provides an anisotropic scattering sheet between the liquid crystal display panel and the lenticular lens, so as to prevent the image quality from being lowered by the shielding region between pixels.

CITATION LIST

Patent Literature

Patent Literature 1: Japanese Patent Application Laid-Open No. 2008-134617

SUMMARY OF INVENTION

Technical Problem

Nonetheless, the invention disclosed in Patent Literature 1 also allows the anisotropic scattering sheet to scatter the light required for forming images, thereby lowering the image quality. For preventing the image quality from deteriorating as such, a lens component having a specific form may be used in place of the lenticular lens. However, the lens component having a special form is not always easy to manufacture.

For solving the problems mentioned above, it is an object of the present invention to provide an image display device capable of displaying high-quality images respectively to a plurality of viewpoints and a lens component which can be used favorably in the image display device and manufactured easily.

Solution to Problem

The lens component in accordance with the present invention is a lens component for forming an image on an object surface onto an image surface. The lens component comprises (1) K unit lenses, each extending in a first direction and having a common structure, arranged in parallel at a minimum period $P_L$ in a second direction perpendicular to the first direction. (2) Each of the K unit lenses includes M partial lenses sectioned within the minimum period $P_L$ in the second direction and a flat part disposed between the M partial lenses. (3) The M partial lenses have respective optical axes different from each other but parallel to a third direction perpendicular to both of the first and second directions and form images of a common point on the object surface onto the image surface at respective positions different from each other. Each of K and M is an integer of 2 or greater.

In each unit lens in the lens component in accordance with the present invention, the flat part may have a width in the second direction equal to or greater than a distance between the respective optical axes of the M partial lenses. In each unit lens in the lens component in accordance with the present invention, the flat part may have a width in the second direction smaller than ½ of that in the second direction of the unit lens. In the lens component in accordance with the present invention, the M partial lenses included in each unit lens may have the same focal length.

The image display device in accordance with the present invention comprises (1) a display panel having a plurality of unit pixel groups arranged two-dimensionally on a plane parallel to both of first and second directions perpendicular to each other, each of the plurality of unit pixel groups including N partial pixels arranged along the second direction, and (2) the lens component of the present invention, provided with the unit lenses corresponding to the unit pixel groups in the second direction, for forming an image on the display panel as the object surface onto the image surface. N is an integer of 2 or greater.

In each of the plurality of unit pixel groups in the display panel in the image display device in accordance with the present invention, a shielding region exists between N partial pixels along the second direction. The width of the shielding region in the second direction is equal to or smaller than a distance in the second direction between the respective optical axes of the M partial lenses included in each unit lens of the lens component.

The image display device in accordance with the present invention may be constructed such that M is 2, while a midpoint in the second direction between respective optical axes of two partial lenses included in a given unit lens located near a center in the second diction in the K unit lenses is identical to a center position of a given unit pixel group located near a center in the second direction in the plurality of unit pixel groups in the display panel. In the image display device in accordance with the present invention, the lens component and display panel may have respective marks for alignment in assembling thereof.

Advantageous Effects of Invention

The present invention can display images respectively to a plurality of viewpoints, inhibit the images from lowering their quality, and be manufactured easily.

BRIEF DESCRIPTION OF DRAWINGS

FIG. 10 is a set of charts illustrating a light intensity distribution on the image surface A in the reference mode;

FIG. 18 is a set of charts illustrating calculation results of the third reference example;

FIG. 44 is a set of diagrams explaining marks for alignment used when assembling the lens component 10 and the display panel 20.

DESCRIPTION OF EMBODIMENTS

Figure 1:
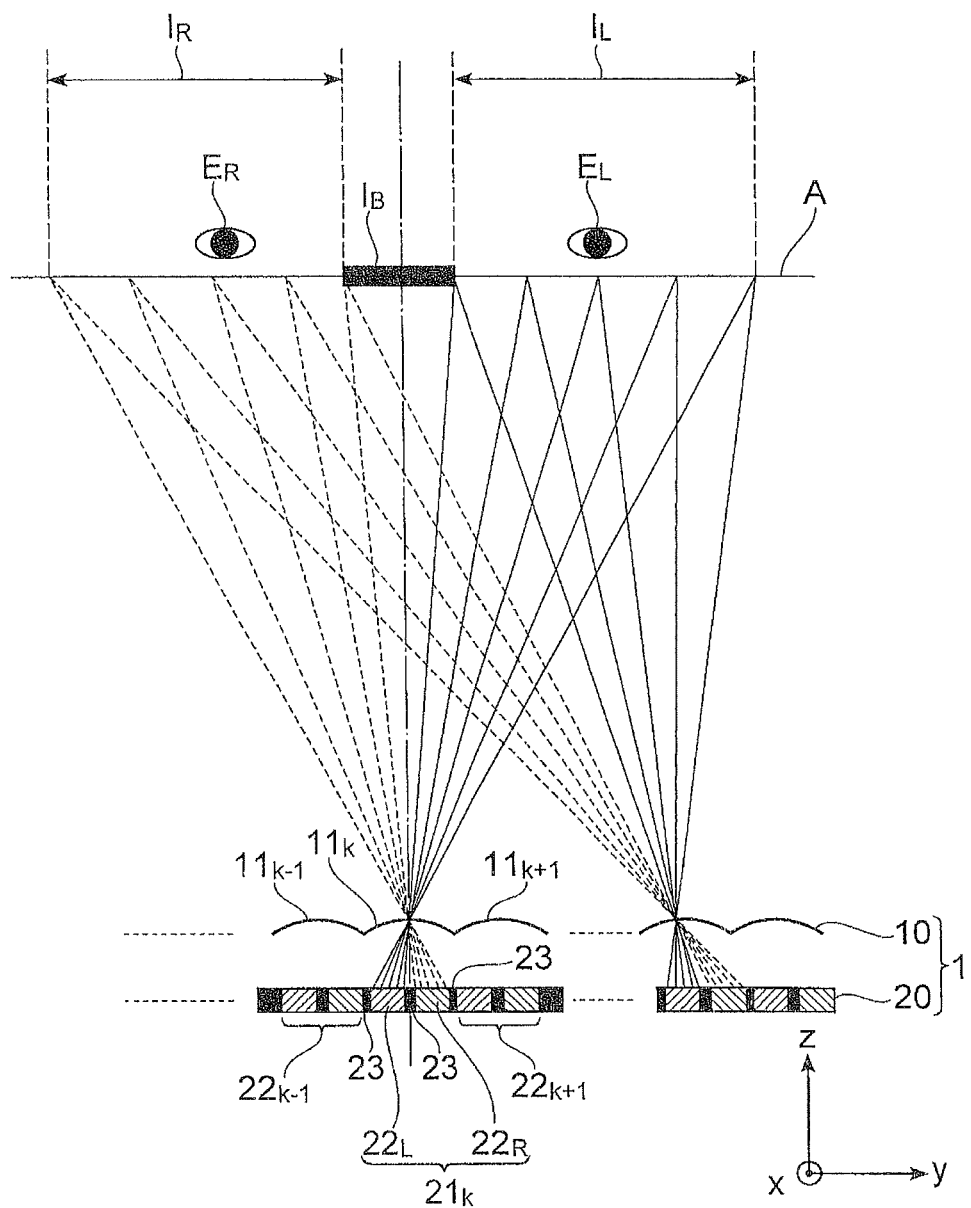
FIG. 1 is a diagram schematically illustrating a principle of how an image display device 1 of a first comparative example displays images.

In the following, embodiments of the present invention will be explained in detail with reference to the drawings. In the explanation of the drawings, the same or equivalent constituents will be referred to with the same signs while omitting their overlapping descriptions. First, image display devices of comparative examples and a reference mode will be explained. Next, the image display device of an embodiment will be explained. The reference mode is used for explaining matters on which the structure of the embodiment of the present invention is to be based. For convenience of explanation, an XYZ orthogonal coordination system is illustrated in the drawings.

FIG. 1 is a diagram schematically illustrating a principle of how an image display device 1 of a first comparative example displays images. The image display device 1 comprises a lens component 10 and a display panel 20. The image display device 1 acts such that images on the display panel 20 as an object surface are formed onto an image surface A through the lens component 10.

The lens component 10 is a lenticular lens in which cylindrical lenses $11_1$ to $11_K$, each extending in the X direction and having a common structure, are arranged as unit lenses in parallel at a fixed period in the Y direction. K is an integer of 2 or greater. The cylindrical lenses $11_1$ to $11_K$ have respective optical axes parallel to the Z direction. The lens component 10 has a roughly plate-like form with a flat surface facing the display panel 20 and a convex surface facing the image surface A. FIG. 1 illustrates the form of the convex surface of the lens component 10.

The display panel 20 has a plurality of unit pixel groups $21_k$ arranged two-dimensionally on the XY plane. Each unit pixel group $21_k$ includes two partial pixels $22_L$, $22_R$. The left- and right-eye partial pixels $22_L$, $22_R$ are arranged alternately in the Y direction. A shielding region 23 called black matrix exists between the left- and right-eye partial pixels $22_L$, $22_R$.

Assuming that the unit pixel group $21_k$ corresponds to the cylindrical lens $11_k$, light emitted from the left-eye partial pixel $22_L$ of the unit pixel group $21_k$ forms a left-eye image $I_L$ on the image surface A through the cylindrical lens $11_k$, while light emitted from the right-eye partial pixel $22_R$ of the unit pixel group $21_k$ forms a left-eye image $I_L$ on the image surface A through the cylindrical lens $11_k$. The left-eye image $I_L$ is formed on the retina of a left eye $E_L$ within a range where the left-eye image $I_L$ is produced on the image surface A. The right-eye image $I_R$ is formed on the retina of a right eye $E_R$ within a range where the right-eye image $I_R$ is produced on the image surface A. Hence, providing the left- and right-eye partial pixels $22_L$, $22_R$ of each unit pixel group $21_k$ with their appropriate image data enables the left and right eyes $E_L$, $E_R$ to visually recognize a three-dimensional image.

However, a black area $I_B$ corresponding to the shielding region 23 occurs between the left- and right-eye images $I_L$, $I_R$ on the image surface A. This black area $I_B$ may be recognized depending on the position on the image surface A and observed as a black streak within the three-dimensional image, which lowers the image quality.

Figure 2:
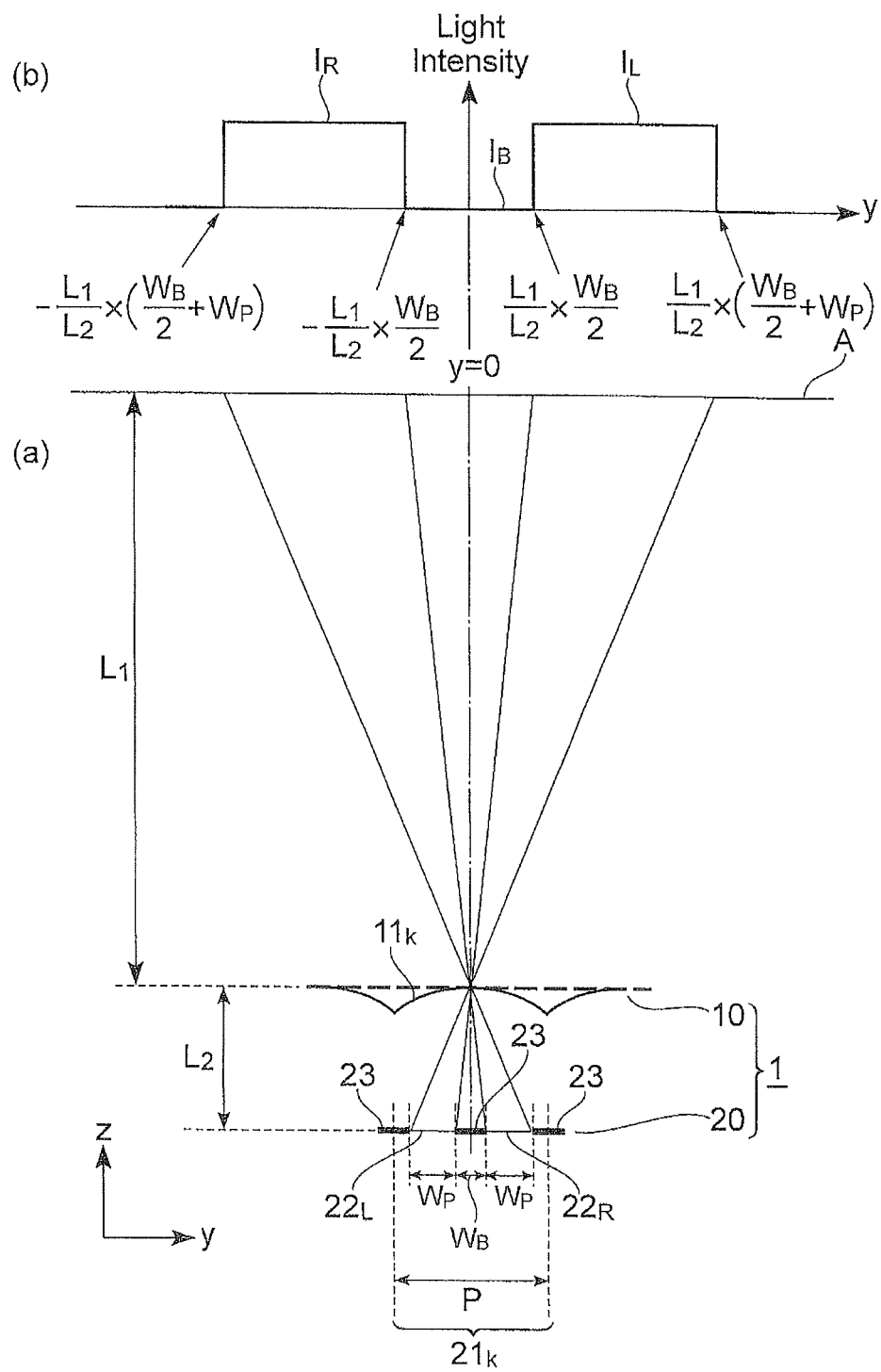
FIG. 2 is a set of diagrams explaining a relationship between a pixel on a display panel 20 and an image on an image surface A in the image display device 1 of the first comparative example.
Figure 3:
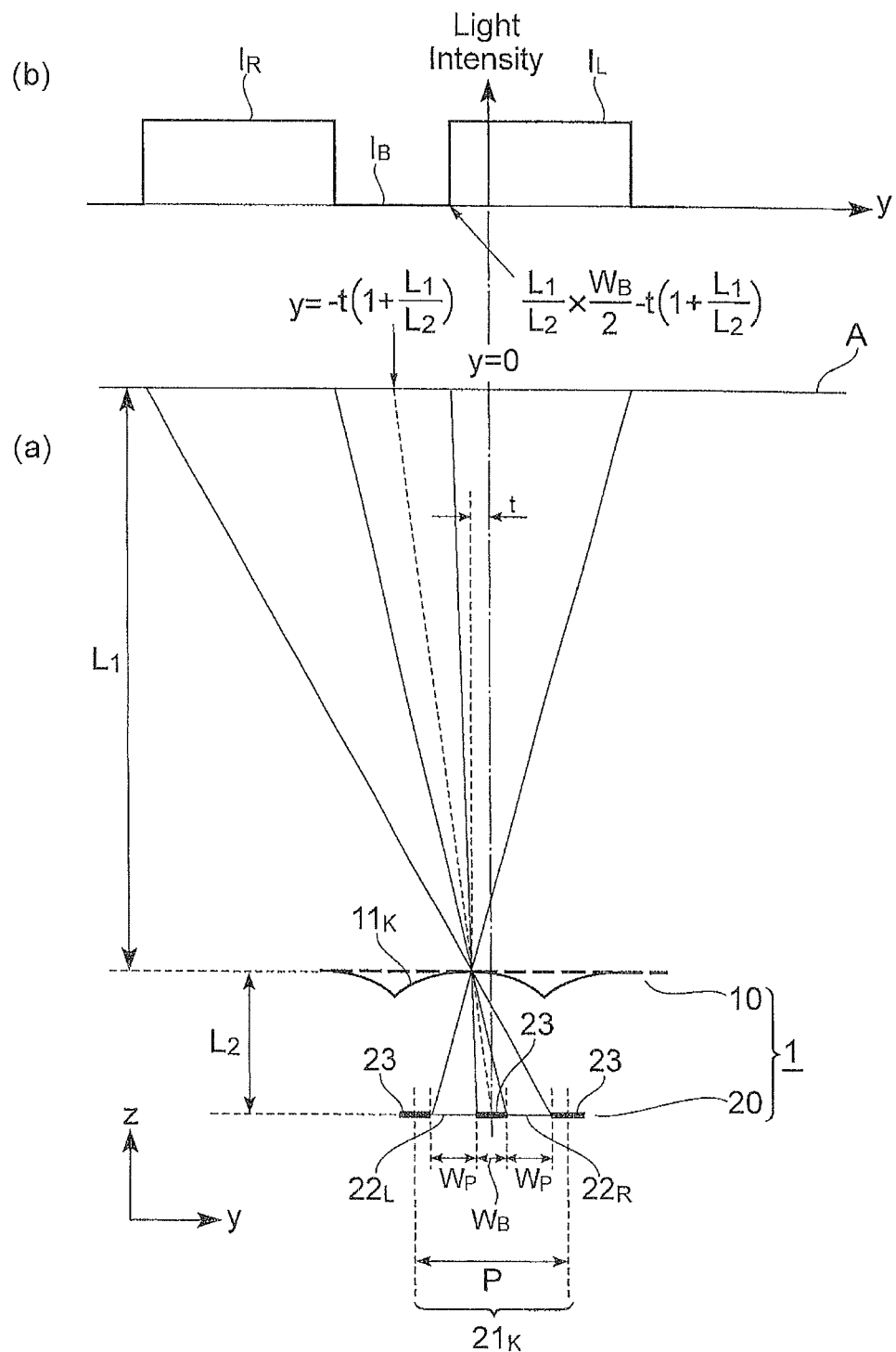
FIG. 3 is a set of diagrams explaining the relationship between the pixel on the display panel 20 and the image on the image surface A in the image display device 1 of the first comparative example.

FIGS. 2 and 3 are diagrams explaining a relationship between a pixel on the display panel 20 and an image on the image surface A in the image display device 1 of the first comparative example. Let $W_P$ be the width in the Y direction of each of the partial pixels $22_L$, $22_R$ included in the unit pixel group $21_k$. Let $W_B$ be the width in the Y direction of the shielding region 23 between the partial pixels $22_L$, $22_R$ included in the unit pixel group $21_k$. Let $P (=2(W_P+W_B))$ be the width in the Y direction of the unit pixel group $21_k$. Let $L_1$ be the distance between a principal plane on the exit side of the lens component 10 and the image surface A. Let $L_2$ be the distance between a principal plane on the entrance side of the lens component 10 and the display panel 20.

A triangle having a base defined by the width in the Y direction of the partial pixels $22_L$, $22_R$ and a height given by the distance $L_2$ and a triangle having a base defined by the width in the Y direction of the images $I_L$, $I_R$ on the image surface A and a height given by the distance $L_1$ are similar to each other. Strictly speaking, other members (such as glass, polarizers, and adhesives) may exist between the lens component 10 and the display panel 20. In a paraxial approximation assuming that a lens has a uniform thickness to its leading end regardless of the position, the distance $L_2$ is the sum of the thicknesses of layers divided by their respective refractive indexes. $L_1$, $L_2$ are obtained by solving a ray matrix according to the thickness and refractive index of each member and the position (observation position) of the set image surface A.

In FIG. 2(a), each of the center in the Y direction of the unit pixel group $21_k$ and the center in the Y direction of the cylindrical lens $11_k$ corresponding to the unit pixel group $21_k$ is located at Y=0. At this time, on the image surface A as illustrated in FIG. 2(b), the left-eye image $I_L$ corresponding to the left-eye partial pixel $22_L$ is formed within the range in the Y direction represented by the following expression (1), while the right-eye image $I_R$ corresponding to the right-eye partial pixel $22_R$ is formed within the range in the Y direction represented by the following expression (2). The black area $I_B$ corresponding to the shielding region 23 is formed within the range in the Y direction represented by the following expression (3). Here, α is the lens magnification, which is represented by $\alpha = L_1/L_2$.

[Math. 1]
$$+\alpha \frac{W_B}{2} < Y < +\alpha\left(\frac{W_B}{2} + W_P\right) \quad (1)$$

[Math. 2]
$$-\alpha\left(\frac{W_B}{2} + W_P\right) < Y < -\alpha\frac{W_B}{2} \quad (2)$$

[Math. 3]
$$-\alpha\frac{W_B}{2} < Y < +\alpha\frac{W_B}{2} \quad (3)$$

In FIG. 3(a), the center in the Y direction of the unit pixel group $21_k$ is located at Y=0. On the other hand, the center in the Y direction of the cylindrical lens $11_k$ corresponding to the unit pixel group $21_k$ is located at Y=−t. At this time, on the image surface A as illustrated in FIG. 3(b), the left-eye image $I_L$ corresponding to the left-eye partial pixel $22_L$ is formed within the range in the Y direction represented by the following expression (4), while the right-eye image $I_R$ corresponding to the right-eye partial pixel $22_R$ is formed within the range in the Y direction represented by the following expression (5). The black area $I_B$ corresponding to the shielding region 23 is formed within the range in the Y direction represented by the following expression (6).

[Math. 4]
$$+\alpha\frac{W_B}{2} - t(1+\alpha) < Y < +\alpha\left(\frac{W_B}{2} + W_P\right) - t(1+\alpha) \quad (4)$$

[Math. 5]
$$-\alpha\left(\frac{W_B}{2} + W_P\right) - t(1+\alpha) < Y < -\alpha\frac{W_B}{2} - t(1+\alpha) \quad (5)$$

[Math. 6]
$$-\alpha\frac{W_B}{2} - t(1+\alpha) < Y < +\alpha\frac{W_B}{2} - t(1+\alpha) \quad (6)$$

That is, the cylindrical lens $11_k$ moves by −t in the Y direction with respect to the unit pixel group $21_k$ in FIG. 3 as compared with FIG. 2, thereby shifting each of the left-eye image $I_L$, right-eye image $I_R$, and black area $I_B$ by $-t(1+L_1/L_2)$ in the Y direction on the image surface A. Hence, in FIG. 3, light reaches a part where the light intensity is 0 on the image surface A in FIG. 2.

Figure 4:
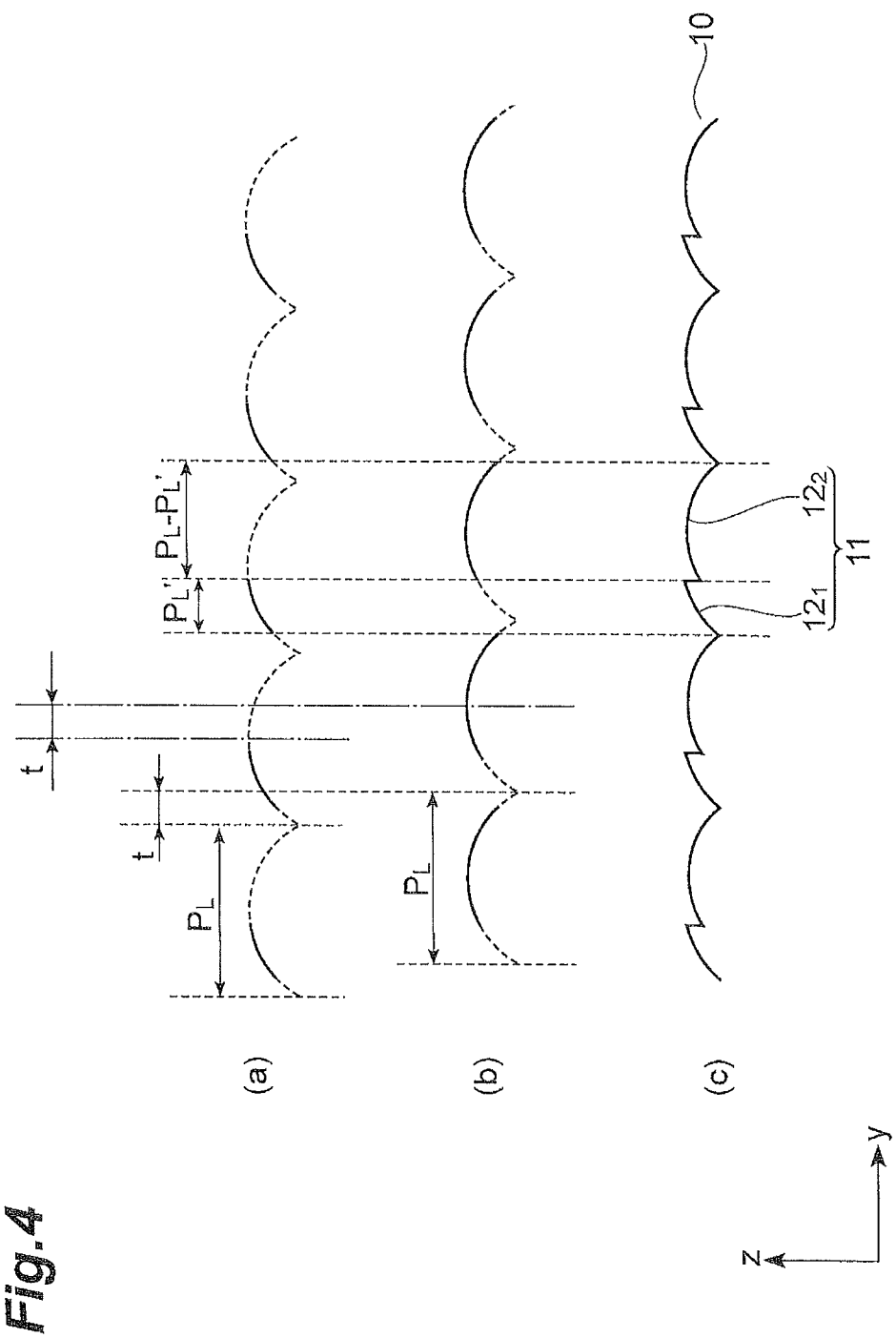
FIG. 4 is a set of diagrams illustrating a lens component 10 in an image display device of a reference mode.

FIG. 4 is a set of diagrams illustrating the lens component 10 in the image display device of the reference mode. FIG. 4 illustrates forms of the convex surface of the lens component 10. Each of FIGS. 4(a) and 4(b) illustrates a lenticular lens in which a plurality of cylindrical lenses, each extending in the X direction and having a common structure, are arranged in parallel at a fixed period $P_L$ in the Y direction. This lenticular lens is the same as that included in the image display device of the first comparative example. The lenticular lens of FIG. 4(b) is shifted by t in the Y direction from that of FIG. 4(a).

The lens component 10 illustrated in FIG. 4(c) comprises K unit lenses 11, each extending in the X direction and having a common structure, arranged in parallel at the minimum period $P_L$. Each unit lens 11 includes two partial lenses $12_1$, $12_2$ which are sectioned within the minimum period $P_L$ in the Y direction. The partial lens $12_1$ falling in the range of 0 to $P_L'$ within the minimum period $P_L$ corresponds to a solid-line part in FIG. 4(a). The partial lens 12₂ falling in the range of $P_L'$ to $P_L$ within the minimum period $P_L$ corresponds to a solid-line part in FIG. 4(b).

That is, the two partial lenses 12₁, 12₂ included in each unit lens 11 have respective optical axes different from each other but parallel to the Z direction (separated from each other by t in the Y direction) and can form images of a common point on the object surface onto the image surface A at respective positions different from each other (shifted from each other by $-t(1+L_1/L_2)$ in the Y direction). This can narrow or eliminate the black area $I_B$ (seen as a black streak at the time of observation) corresponding to the shielding region 23.

When the condition represented by the following expression (7) holds from the respective light intensity distributions illustrated in FIGS. 2(b) and 3(b), the area $I_B$ where no light reaches exists on the image surface A. When the condition represented by the following expression (8) holds, the left- and right-eye images $I_L$, $I_R$ partly overlap on the image surface A, thereby generating crosstalk. Therefore, it will be optimal if the condition represented by the following expression (9) holds. In each of the expressions (7) to (9), the left side represents the left boundary position of the black area $I_B$ in FIG. 2, while the right side represents the right boundary position of the black area $I_B$ in FIG. 3.

[Math. 7]
$$-\alpha\frac{W_B}{2} < \alpha\frac{W_B}{2} - t(1+\alpha) \quad (7)$$

[Math. 8]
$$-\alpha\frac{W_B}{2} > \alpha\frac{W_B}{2} - t(1+\alpha) \quad (8)$$

[Math. 9]
$$-\alpha\frac{W_B}{2} = \alpha\frac{W_B}{2} - t(1+\alpha) \quad (9)$$

The following expression (10) is obtained from the above-mentioned expression (9). Typically, the distance $L_1$ is several hundred mm and thus is sufficiently long, while the distance $L_2$ ranges from several hundred μm to several mm. Therefore, the expression (10) can be approximated by the following expression (11).

[Math. 10]
$$t = \frac{W_B L_1}{L_1 + L_2} \quad (10)$$

[Math. 11]
$$t = W_B \quad (11)$$

The partial lenses 12₁, 12₂ included in each unit lens 11 in the lens component 10 may have any of spherical and aspherical lens forms in their YZ cross section. The respective lens forms of the partial lenses 12₁, 12₂ are obtained by solving the ray matrix. However, even when the respective lens forms of the partial lenses 12₁, 12₂ differ from solutions of the ray matrix by about several %, viewpoints can sufficiently be separated from each other, thus leaving no problem in practice. In terms of uniformity of image quality in the Y direction on the image surface A, however, it is preferable for the partial lenses 12₁, 12₂ included in each unit lens 11 to have the same focal length.

Figure 5:
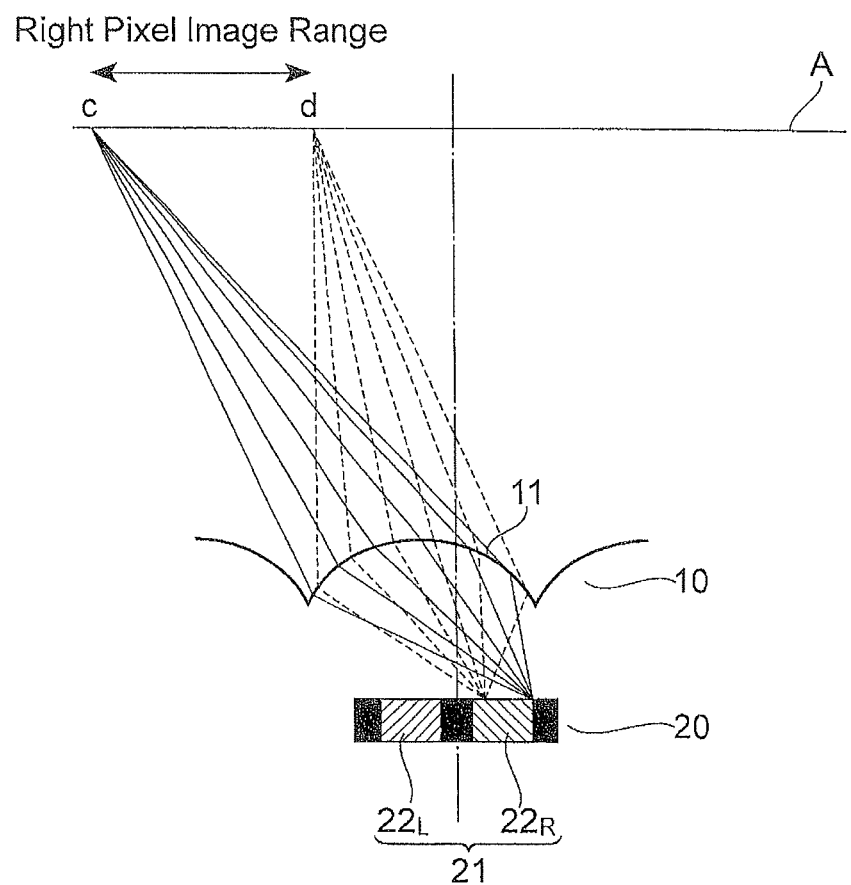
FIG. 5 is a diagram illustrating loci of light beams from a partial pixel $22_R$ when a lens shifts in the −Y direction with respect to the display panel 20 in the first comparative example.
Figure 6:
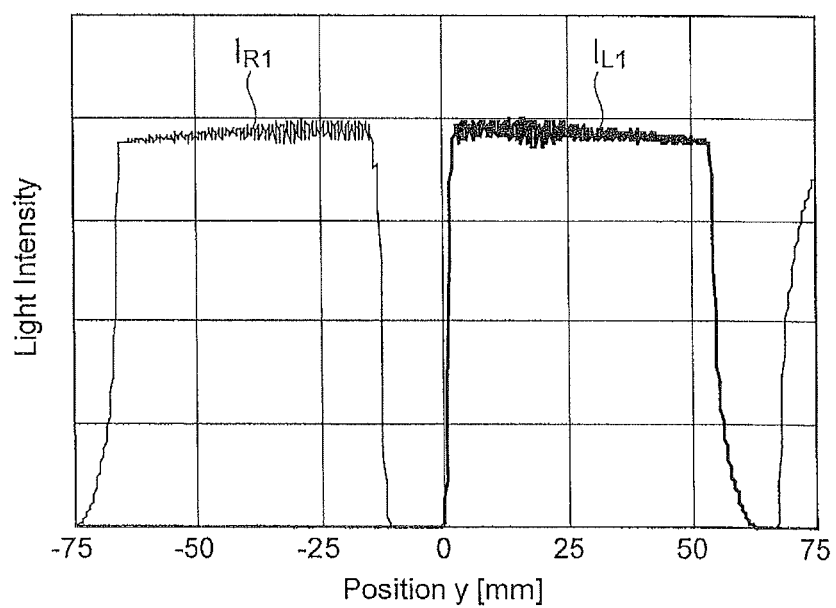
FIG. 6 is a chart illustrating a light intensity distribution on the image surface A when the lens shifts in the −Y direction with respect to the display panel 20 in the first comparative example.
Figure 7:
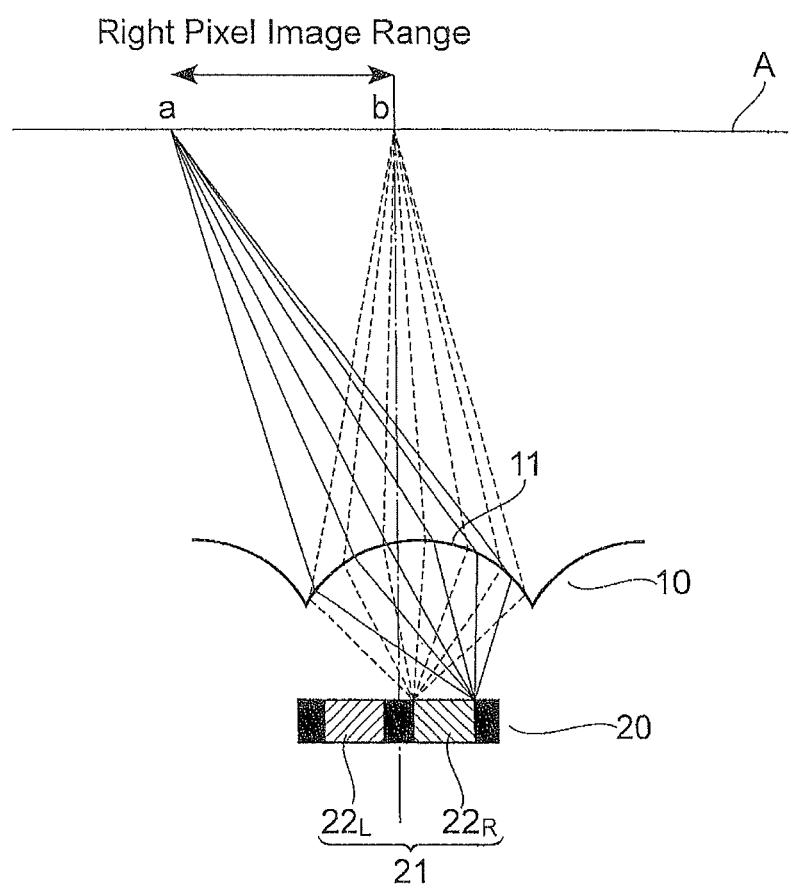
FIG. 7 is a diagram illustrating loci of light beams from the partial pixel $22_R$ when the lens shifts in the +Y direction with respect to the display panel 20 in the first comparative example.
Figure 8:
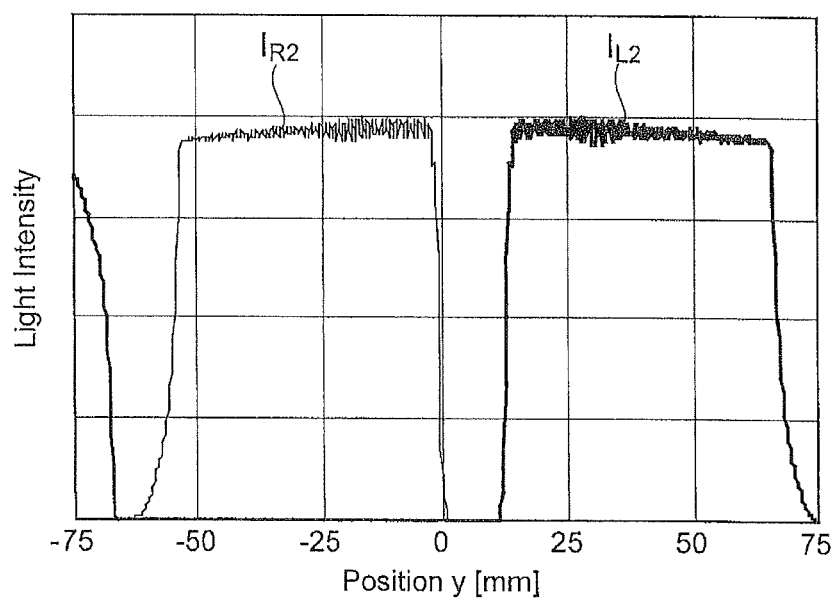
FIG. 8 is a chart illustrating a light intensity distribution on the image surface A when the lens shifts in the +Y direction with respect to the display panel 20 in the first comparative example.
Figure 9:
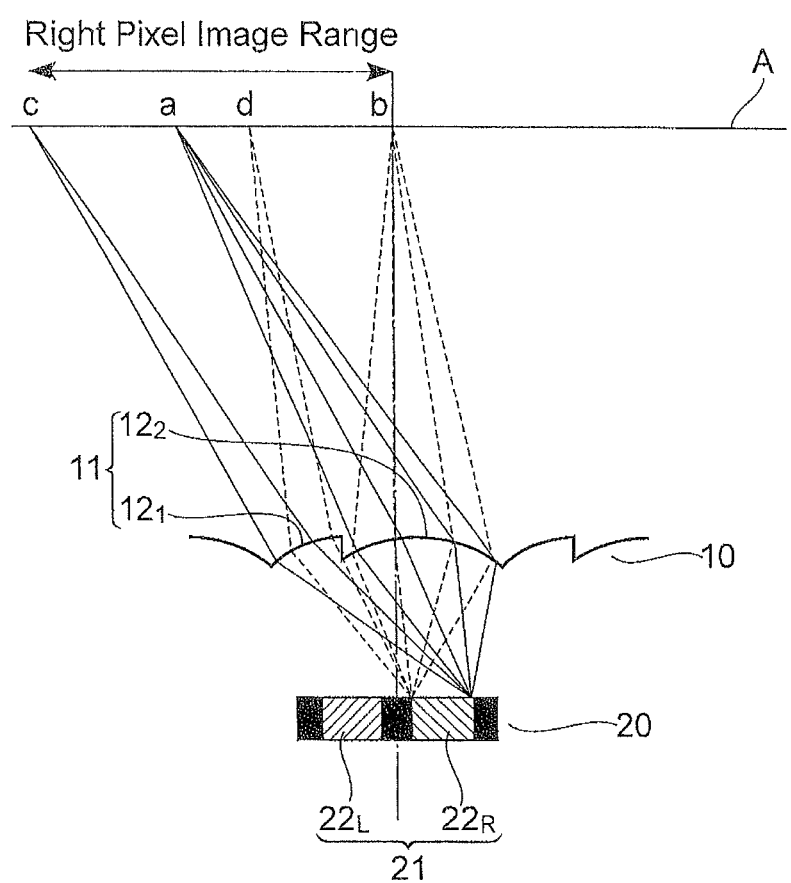
FIG. 9 is a diagram illustrating loci of light beams from the partial pixel $22_R$ in the reference mode.

Operations of the image display devices of the first comparative example and reference mode will now be explained with reference to FIGS. 5 to 10. FIG. 5 is a diagram illustrating loci of light beams from the partial pixel 22$_R$ when the lens shifts in the −Y direction with respect to the display panel 20 in the first comparative example. FIG. 6 is a chart illustrating a light intensity distribution on the image surface A when the lens shifts in the −Y direction with respect to the display panel 20 in the first comparative example. FIG. 7 is a diagram illustrating loci of light beams from the partial pixel 22$_R$ when the lens shifts in the +Y direction with respect to the display panel 20 in the first comparative example. FIG. 8 is a chart illustrating a light intensity distribution on the image surface A when the lens shifts in the +Y direction with respect to the display panel 20 in the first comparative example. FIG. 9 is a diagram illustrating loci of light beams from the partial pixel 22$_R$ in the reference mode. FIG. 10 is a set of charts illustrating a light intensity distribution on the image surface A in the reference mode.

When the lens shifts in the −Y direction with respect to the display panel 20 in the first comparative example as illustrated in FIGS. 5 and 6 (in the case of FIG. 4(a)), right- and left-eye images $I_{R1}$, $I_{L1}$ on the image surface A also shift in the −Y direction. When the lens shifts in the +Y direction with respect to the display panel 20 as illustrated in FIGS. 7 and 8 (in the case of FIG. 4(b)), on the other hand, right- and left-eye images $I_{R2}$, $I_{L2}$ on the image surface A also shift in the +Y direction.

In the reference mode, by contrast, the right- and left-eye images $I_{R1}$, $I_{L1}$ formed on the image surface A through the partial lens 12₁ in the unit lens 11 and the right- and left-eye images $I_{R2}$, $I_{L2}$ formed on the image surface A through the partial lens 12₂ in the unit lens 11 are located in areas different from each other on the image surface A (FIG. 10(a)) as illustrated in FIGS. 9 and 10. Therefore, on the image surface A, the reference mode forms the right-eye image $I_R$ in which the right-eye images $I_{R1}$, $I_{R2}$ overlap each other and the left-eye image $I_L$ in which the left-eye images $I_{L1}$, $I_{L2}$ overlap each other (FIG. 10(b)).

Examples of calculating light intensity distributions on the image surface A in the first comparative example and first, second, and third reference examples will now be explained. The first, second, and third reference examples are specific examples of the reference mode. The lens is assumed to be a spherical lens in the following examples of calculations.

Figure 11:
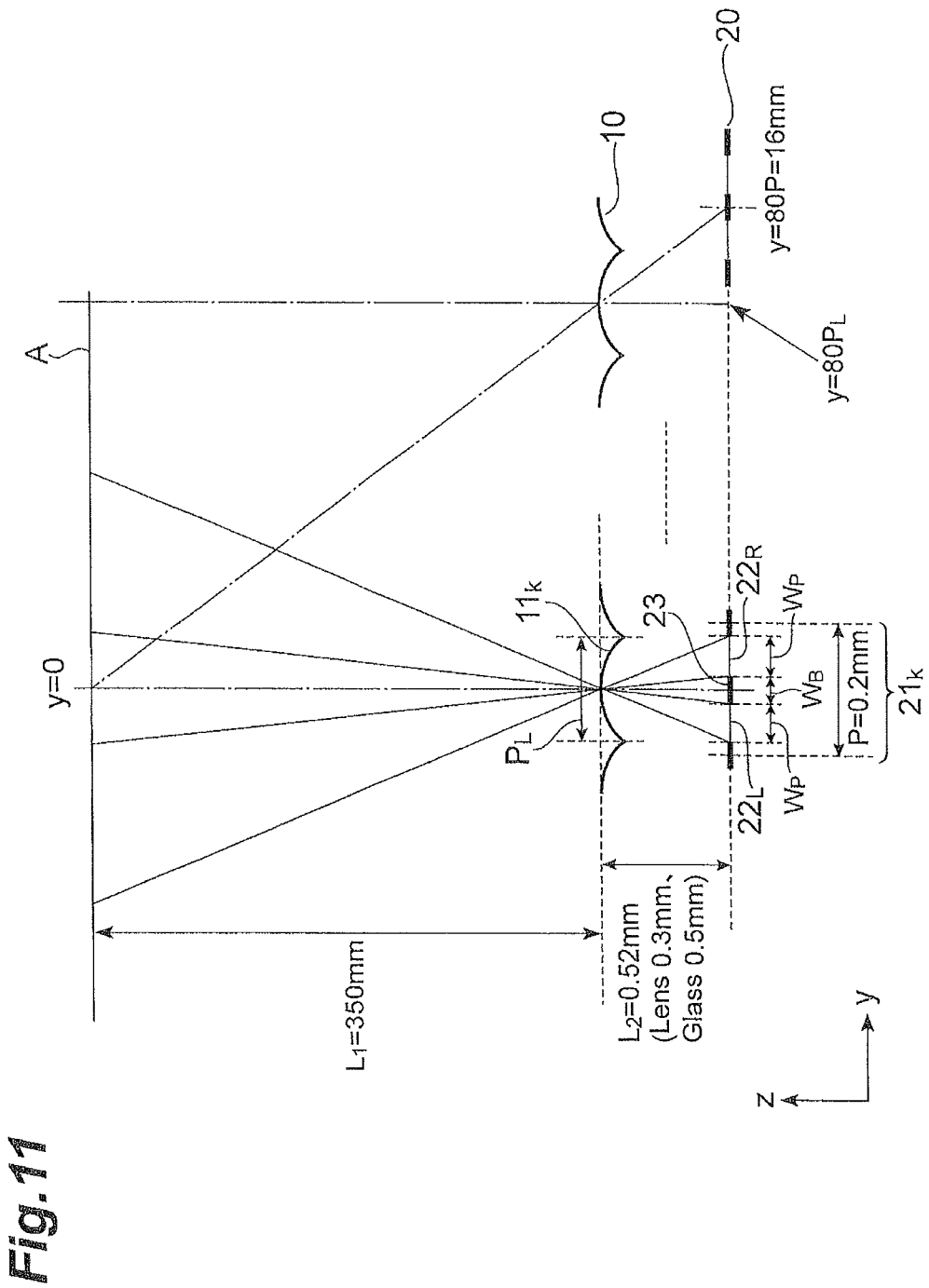
FIG. 11 is a diagram illustrating calculation conditions of the first comparative example.
Figure 12:
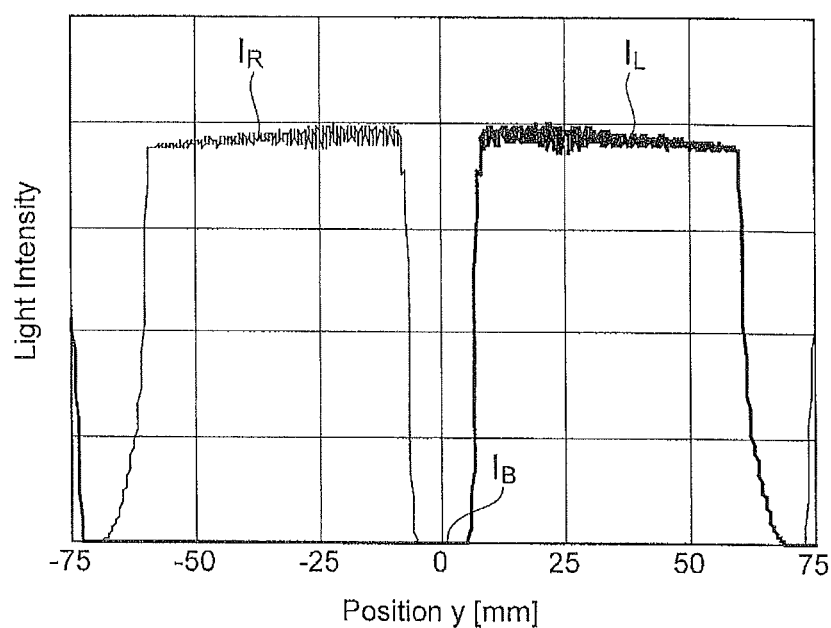
FIG. 12 is a chart illustrating calculation results of the first comparative example.

FIG. 11 is a diagram illustrating calculation conditions of the first comparative example. FIG. 12 is a chart illustrating calculation results of the first comparative example. In the first comparative example, the width P in the Y direction of a unit pixel group is 0.2 mm as illustrated in FIG. 11. The width $W_P$ in the Y direction of each of the partial pixels included in the unit pixel group is 0.08 mm. The width $W_B$ in the Y direction of the shielding region 23 between the partial pixels included in the unit pixel group is 0.02 mm.

The distance $L_1$ between the principal plane on the exit side of the lens and the image surface A is 350 mm. The distance $L_2$ between the principal plane on the entrance side of the lens and the display panel 20 is 0.52 mm. The thickness of the lens is 0.3 mm. The refractive index of the lens is 1.6. Assuming that a glass sheet having a thickness of 0.5 mm and a refractive index of 1.5 exists between the lens and the display panel 20, the distance $L_2$ is 0.52 mm (=0.3/1.6+0.5/1.5). Polarizers and adhesives, which may exist between the lens and the display panel 20 in practice, are neglected.

The ray matrix is solved by using these values of parameters, whereby the radius of curvature of the lens is calculated as 0.31 mm. The display panel 20 is assumed to have a width of 32.2 mm in the Y direction thereof and comprise 161 unit pixel groups.

In FIG. 11, the outermost unit pixel group located at Y=80P=16 mm is the 80th unit pixel group counted from the unit pixel group located at the center (Y=0). For substantially superposing the respective images having arrived from the unit pixel groups on the image surface A within the visually recognizable range, the image at the center position of the 80th unit pixel group located at Y=80P is placed at the position Y=0 on the image surface A through the 80th lens located at Y=80$P_L$. From the similarity between triangles as mentioned above, the width $P_L$ in the Y direction of the unit lens is calculated as 0.1997 mm.

When all of the partial pixels $22_L$, $22_R$ included in the 161 unit pixel groups of the display panel 20 are lit in the first comparative example, the light intensity distribution on the image surface A is as illustrated in FIG. 12. An area $I_B$ where no light reaches exists between the right- and left-eye images $I_R$, $I_L$ on the image surface A.

Figure 13:
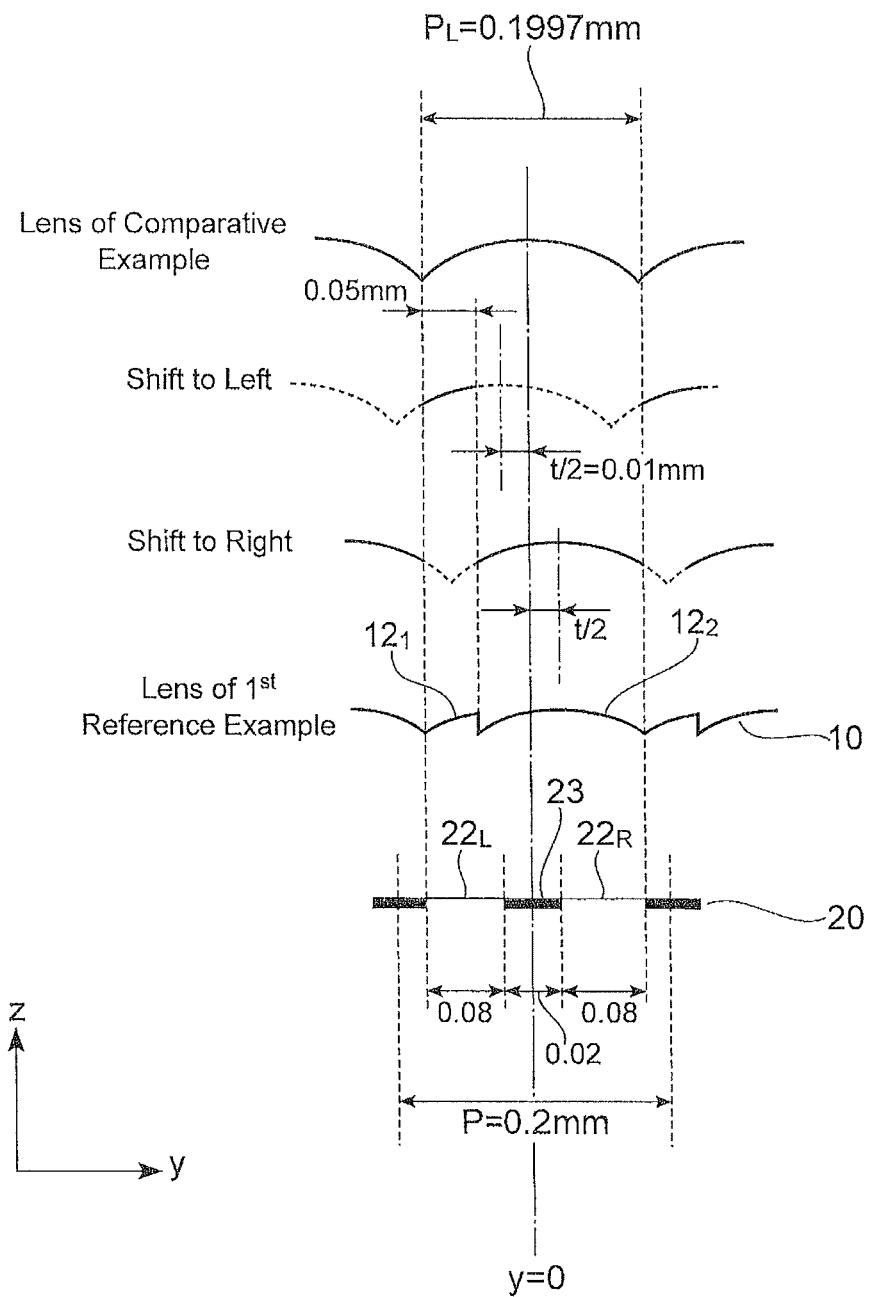
FIG. 13 is a diagram illustrating calculation conditions of a first reference example.
Figure 14:
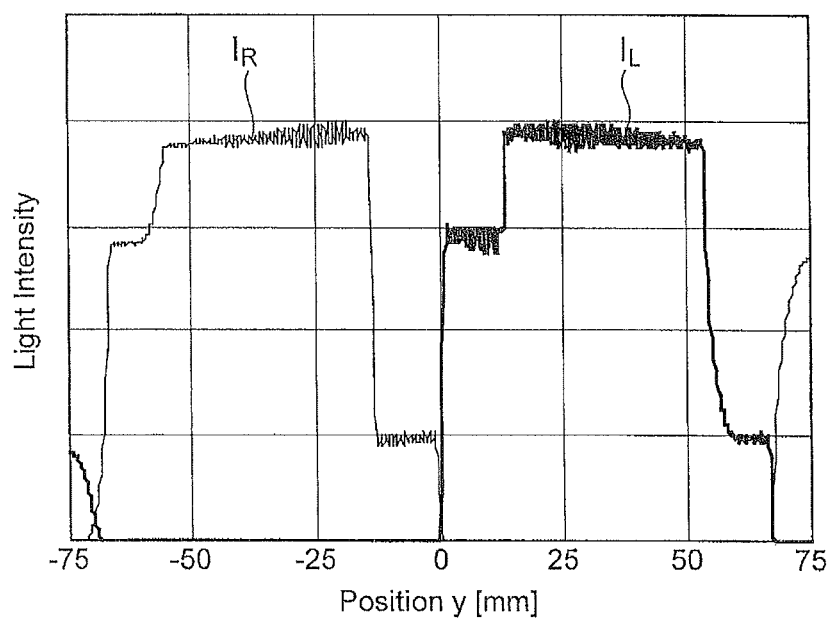
FIG. 14 is a chart illustrating calculation results of the first reference example.

FIG. 13 is a diagram illustrating calculation conditions of the first reference example. FIG. 14 is a chart illustrating calculation results of the first reference example. As illustrated in FIG. 13, the calculation conditions for parameters other than the form of the unit lens in the first reference example are the same as those of the first comparative example mentioned above. In the first reference example, the unit lens includes a partial lens $12_1$ corresponding to a part of the lens of the first comparative example shifted by t/2 in the −Y direction (leftward) and a partial lens $12_2$ corresponding to a part of the lens of the first comparative example shifted by t/2 in the +Y direction (rightward). Here, t/2=$W_B$/2=0.01 mm.

The partial lenses $12_1$, $12_2$ have respective optical axes which are parallel to the Z direction and separated from each other by the distance t. The center position in the Y direction of the respective optical axes of the partial lenses $12_1$, $12_2$ located at the center of the lens component 10 coincides with the center position in the Y direction of the unit pixel group located at the center of the display panel 20. In the width $P_L$ (0.1997 mm) in the Y direction of each unit lens, the partial lens $12_1$ exists in an area having a width of 0.05 mm on the −Y direction side, while the partial lens $12_2$ exists in an area having a width of 0.1497 mm on the +Y direction side.

When all of the partial pixels $22_L$, $22_R$ included in the 161 unit pixel groups of the display panel 20 are lit in the first reference example, the light intensity distribution on the image surface A is as illustrated in FIG. 14. On the image surface A, the area $I_B$ where no light reaches is eliminated from between the right- and left-eye images $I_R$, $I_L$, whereby there is no black streak when the images are observed. In FIG. 14, the light intensity changes stepwise depending on the position, so as to yield some areas with low light intensity, which are nonetheless harder to be recognized by human eyes than the area seen black at the light intensity of 0.

Figure 15:
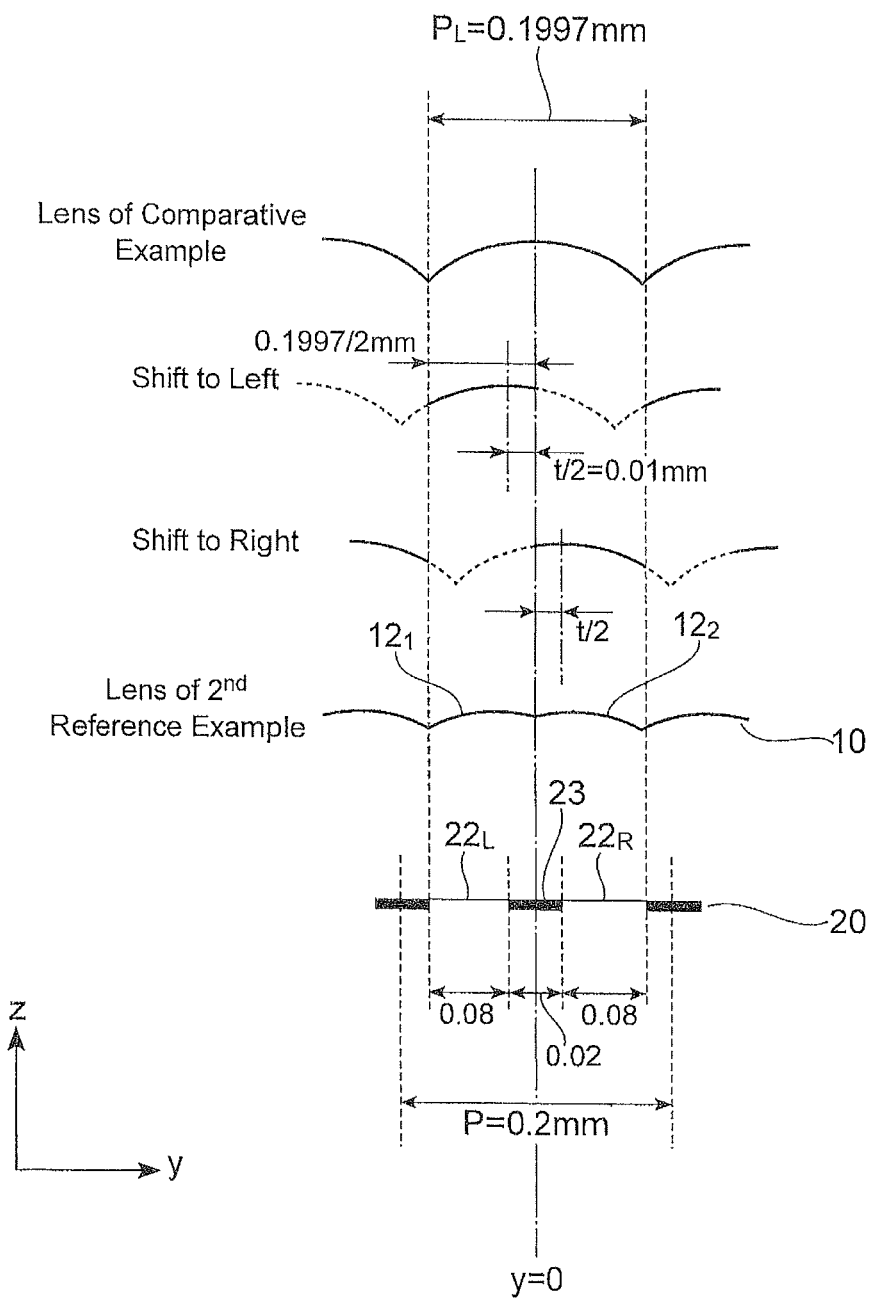
FIG. 15 is a diagram illustrating calculation conditions of a second reference example.
Figure 16:
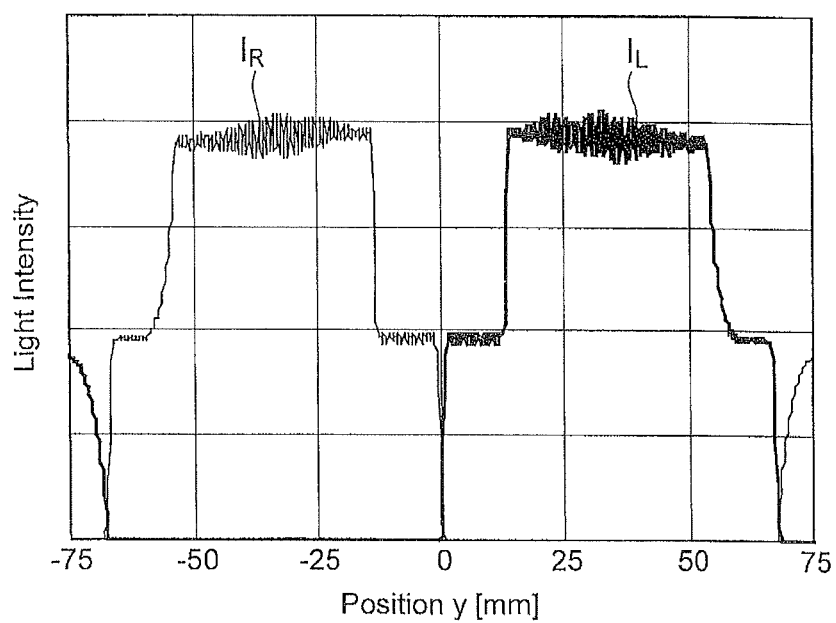
FIG. 16 is a chart illustrating calculation results of the second reference example.

FIG. 15 is a diagram illustrating calculation conditions of the second reference example. FIG. 16 is a chart illustrating calculation results of the second reference example. As illustrated in FIG. 15, the calculation conditions for parameters other than the form of the unit lens in the second reference example are the same as those of the first comparative example mentioned above. The ratio of widths in the Y direction of the partial lenses $12_1$, $12_2$, which is about 1:3 in the first reference example, is 1:1 in the second reference example.

When all of the partial pixels $22_L$, $22_R$ included in the 161 unit pixel groups of the display panel 20 are lit in the second reference example, the light intensity distribution on the image surface A is as illustrated in FIG. 16. The area $I_B$ where no light reaches is eliminated from between the right- and left-eye images $I_R$, $I_L$ on the image surface A, whereby there is no black streak when the images are observed. In the second reference example, the light intensity distribution on the image surface A is symmetrical about the position Y=0, whereby more natural images are obtained. The lens component 10 of the second reference example lacks discontinuous parts unlike the first reference example and thus is easier to manufacture.

Figure 17:
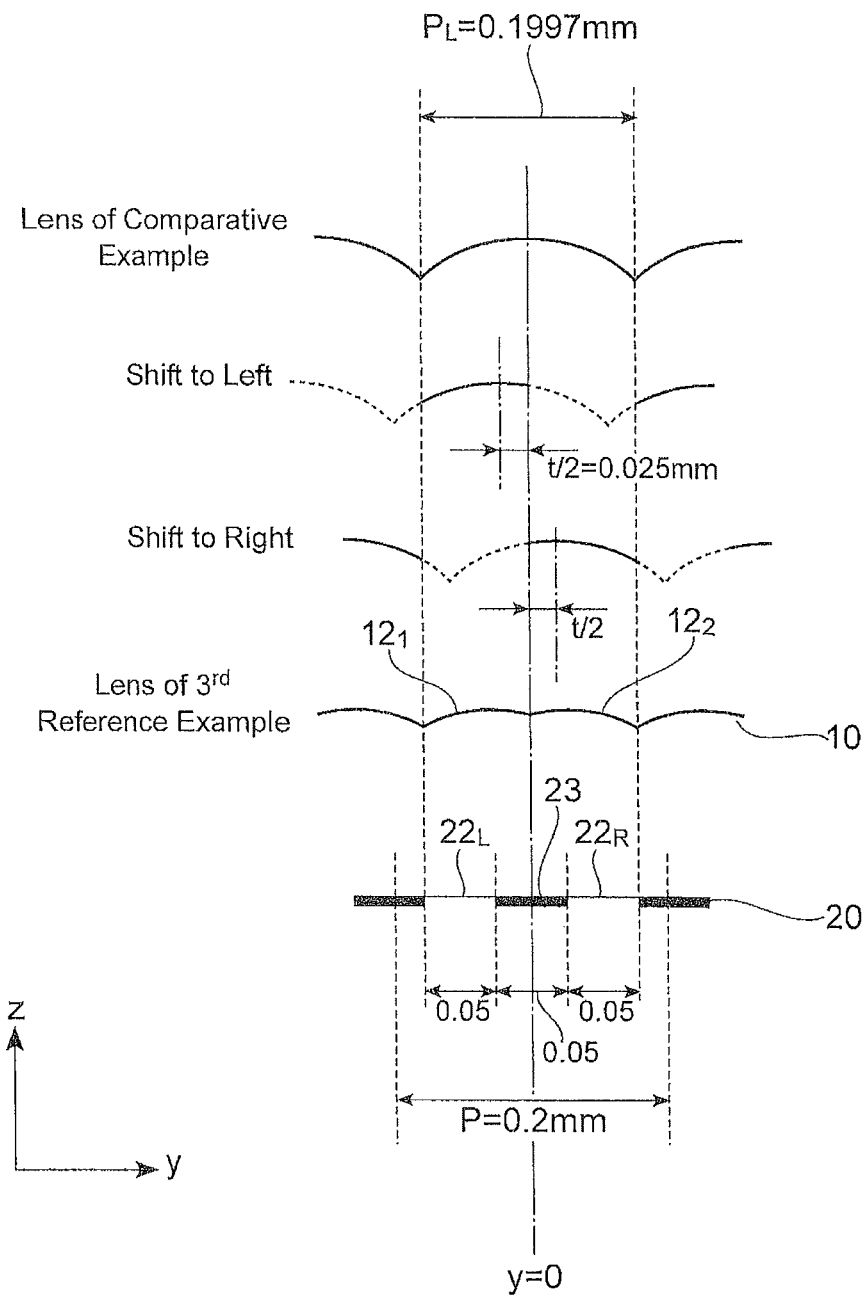
FIG. 17 is a diagram illustrating calculation conditions of a third reference example.

FIG. 17 is a diagram illustrating calculation conditions of the third reference example. FIG. 18 is a chart illustrating calculation results of the third reference example. As illustrated in FIG. 17, as in the first comparative example and first and second reference examples, the width P in the Y direction of the unit pixel group, the distance $L_1$ between the principal plane on the exit side of the lens and the image surface A, the distance $L_2$ between the principal plane on the entrance side of the lens and the image surface A, and the width $P_L$ in the Y direction of the unit lens are 0.2 mm, 350 mm, 0.52 mm, and 0.1997 mm, respectively.

In the third reference example, each of the partial pixels included in the unit pixel group has the width $W_P$ in the Y direction of 0.05 mm, and the shielding region 23 between the partial pixels included in the unit pixel group has the width $W_B$ in the Y direction of 0.05 mm, so that they are equal to each other. The ratio of widths in the Y direction of the partial lenses $12_1$, $12_2$ is 1:1.

When the width $W_P$ in the Y direction of each of the partial pixels included in the unit pixel group and the width $W_B$ in the Y direction of the shielding region 23 between the partial pixels are equal to each other in the first comparative example, the right-eye image $I_R$, left-eye image $I_L$, and black region $I_B$ have the same width in the Y direction on the image surface A. In the third reference example, by contrast, the light intensity distribution on the image surface A obtained when all of the partial pixels $22_L$, $22_R$ included in the 161 unit pixel groups in the display panel 20 are lit is a superposition of the right- and left-eye images $I_R$, $I_L$ shifted by ±t/2 by the partial lenses $12_1$, $12_2$ as illustrated in FIG. 18 and thus is a substantially uniform intensity distribution.

Therefore, the third reference example gives the effect of yielding more natural images having a uniform intensity distribution in addition to that of the second reference example. The substantial visually recognizable range (i.e., the range where the light intensity distribution is nearly uniform), which is Y=−55 mm to −13 mm for the right-eye image $I_R$ and Y=+13 mm to +55 mm for the left-eye image $I_L$ in the first and second reference examples, is Y=−65 mm to 0 mm for the right-eye image $I_R$ and Y=+65 mm to +0 mm for the left-eye image $I_L$ in the third reference example and thus can be made wider for each.

In FIG. 18(*a*), a locally high intensity part is seen near the center of each of the right- and left-eye images $I_R$, $I_L$. This is a switchover part between images formed by respective partial lenses shifted in the +Y and −Y directions, which is caused by a small overlap (the part surrounded by a dotted line in FIG. 18(*b*)) of light intensity distributions slightly trailing due to spherical aberration of lenses. However, such a local intensity change is hard to be recognized by human eyes. This small overlap can be improved by slightly modifying the width of pixels and the amount of shift of lenses, for example.

The number of viewpoints, which is 2 in the comparative examples and reference mode explained in the foregoing, may be 2 or more in general. When the number of viewpoints is N, each of the unit pixel groups in the display panel 20 includes N partial pixels arranged in the Y direction. That is, N pictures are divided into pixels, the respective partial pixels constituting the first, second, . . . , and Nth pictures are arranged in the Y direction on the display panel 20 as a unit pixel group, and lenses sort the respective images of viewpoints.

Figure 19:
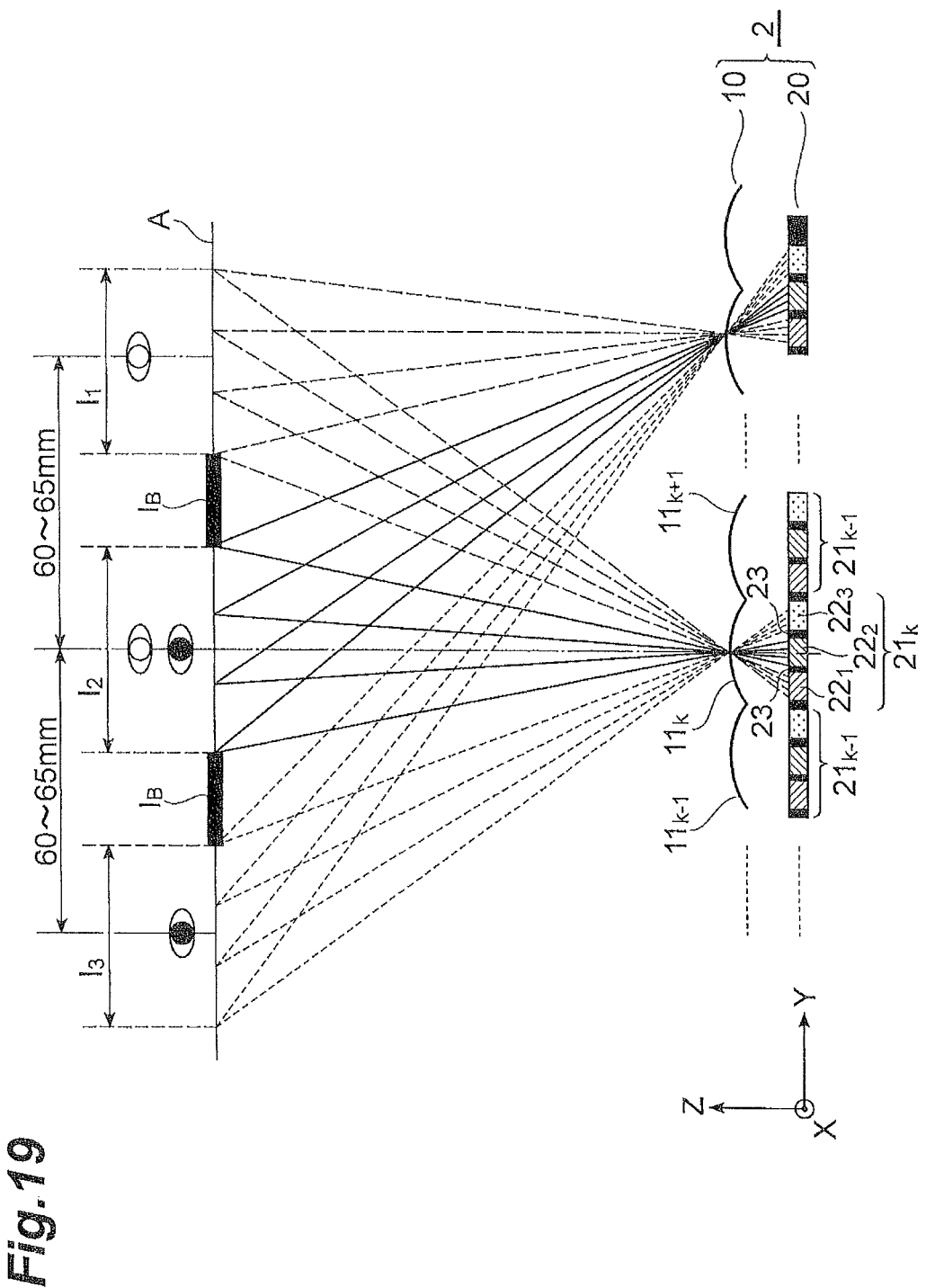
FIG. 19 is a diagram schematically illustrating a principle of how an image display device 2 of a second comparative example displays images.

The case where the number of viewpoints is 3 will now be explained. FIG. 19 is a diagram schematically illustrating a principle of how an image display device 2 of the second comparative example displays images. The image display device 2 comprises a lens component 10 and a display panel 20. The image display device 2 acts such that images on the display panel 20 as an object surface are formed onto an image surface A through the lens component 10. The lens component 10 is the same as that illustrated in FIG. 1.

The display panel 20 has a plurality of unit pixel groups $21_k$ arranged two-dimensionally on the XY plane. When the number of viewpoints is 3, each unit pixel group $21_k$ includes three, i.e., first, second, and third, partial pixels $22_1$, $22_2$, $22_3$. The partial pixels $22_1$, $22_2$, $22_3$ are arranged sequentially in the Y direction. Shielding regions 23 called black matrixes exist between the partial pixels $22_1$, $22_2$ and the partial pixels $22_2$, $22_3$.

Assuming that the unit pixel group $21_k$ corresponds to the cylindrical lens $11_k$, light emitted from the first partial pixel $22_1$ of the unit pixel group $21_k$ forms a first image $I_1$ on the image surface A through the cylindrical lens $11_k$. Light emitted from the second partial pixel $22_2$ of the unit pixel group $21_k$ forms a second image $I_2$ on the image surface A through the cylindrical lens $11_k$. Light emitted from the third partial pixel $22_3$ of the unit pixel group $21_k$ forms a third image $I_3$ on the image surface A through the cylindrical lens $11_k$. The left and right eyes located in ranges where the first and second images are formed on the image surface A visually recognize a three-dimensional image, while the left and right eyes located in ranges where the second and third images are formed on the image surface A visually recognize another three-dimensional image.

Even in this case, however, black areas $I_B$ corresponding to the shielding regions 23 occur between the first and second images $I_1$, $I_2$ and between the second and third images $I_2$, $I_3$ on the image surface A. These black areas $I_B$ may be recognized depending on the position on the image surface A and observed as black streaks within the three-dimensional image, which lowers the image quality.

In such a case where the number of viewpoints is 3, as in the case where the number of viewpoints is 2 explained above, using the lens component 10 illustrated in FIG. 4(c) can narrow or eliminate the black areas $I_B$ (seen as a black streak at the time of observation).

Examples of calculating light intensity distributions on the image surface A in the second comparative example and fourth reference example where the number of viewpoints is 3 will now be explained. The fourth reference example is a specific example of the reference mode where the number of viewpoints is 3. The lens is assumed to be a spherical lens in the following examples of calculations.

Figure 20:
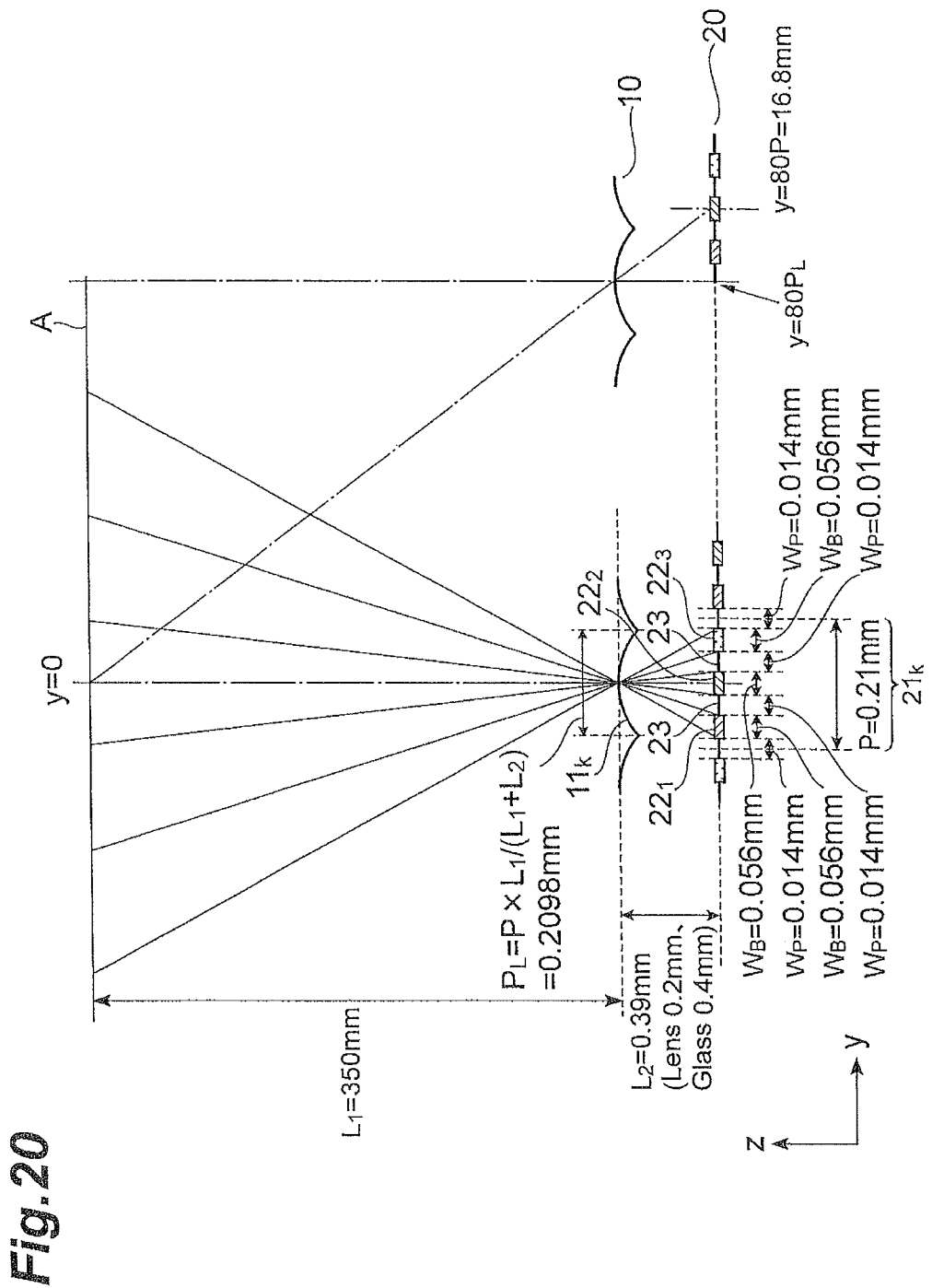
FIG. 20 is a diagram illustrating calculation conditions of a second comparative example.
Figure 21:
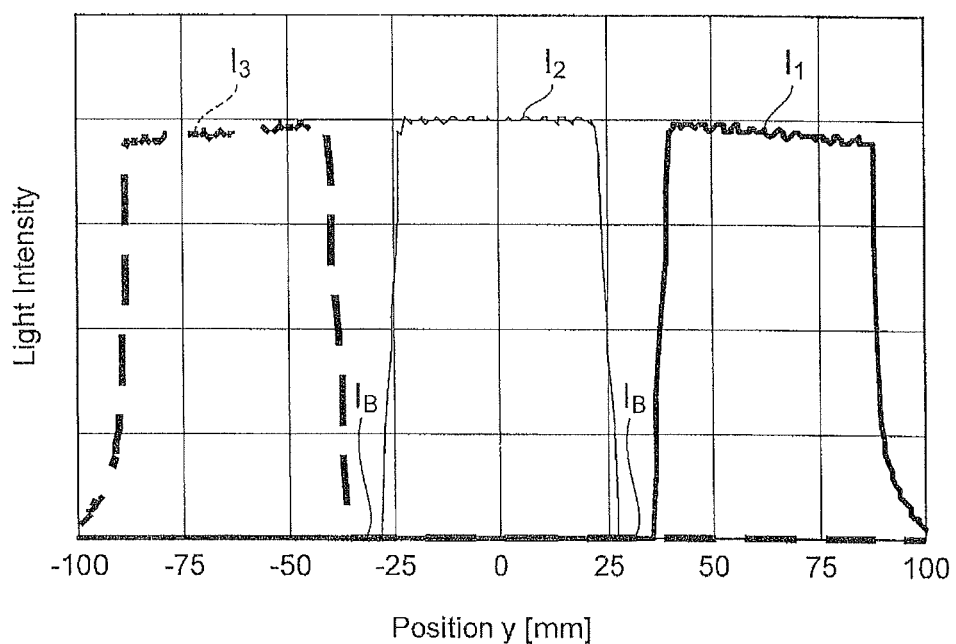
FIG. 21 is a chart illustrating calculation results of the second comparative example.

FIG. 20 is a diagram illustrating calculation conditions of the second comparative example. FIG. 21 is a chart illustrating calculation results of the second comparative example. In the second comparative example, the width P in the Y direction of a unit pixel group is 0.21 mm as illustrated in FIG. 20. The width $W_P$ in the Y direction of each of the partial pixels included in the unit pixel group is 0.056 mm. The width $W_B$ in the Y direction of the shielding region 23 between the partial pixels included in the unit pixel group is 0.014 mm.

The distance $L_1$ between the principal plane on the exit side of the lens and the image surface A is 350 mm. The distance $L_2$ between the principal plane on the entrance side of the lens and the display panel 20 is 0.39 mm. The thickness of the lens is 0.2 mm. The refractive index of the lens is 1.6. Assuming that a glass sheet having a thickness of 0.4 mm and a refractive index of 1.5 exists between the lens and the display panel 20, the distance $L_2$ is 0.39 mm (=0.2/1.6+0.4/1.5). Polarizers and adhesives, which may exist between the lens and the display panel 20 in practice, are neglected.

The ray matrix is solved by using these values of parameters, whereby the radius of curvature of the lens is calculated as 0.235 mm. The display panel 20 is assumed to have a width of 33.81 mm in the Y direction thereof and comprise 161 unit pixel groups.

In FIG. 20, the outermost unit pixel group located at Y=80P=16.8 mm is the 80th unit pixel group counted from the unit pixel group located at the center (Y=0). For substantially superposing the respective images having arrived from the unit pixel groups on the image surface A, the image at the center position of the 80th unit pixel group located at Y=80P is placed at the position Y=0 on the image surface A through the 80th lens located at Y=80$P_L$. From the similarity between triangles as mentioned above, the width $P_L$ in the Y direction of the unit lens is calculated as 0.2098 mm.

When all of the partial pixels $22_1$ to $22_3$ included in the 161 unit pixel groups of the display panel 20 are lit in the second comparative example, the light intensity distribution on the image surface A is as illustrated in FIG. 21. Areas $I_B$ where no light reaches exist between the images $I_1$ to $I_3$ on the image surface A.

Figure 22:
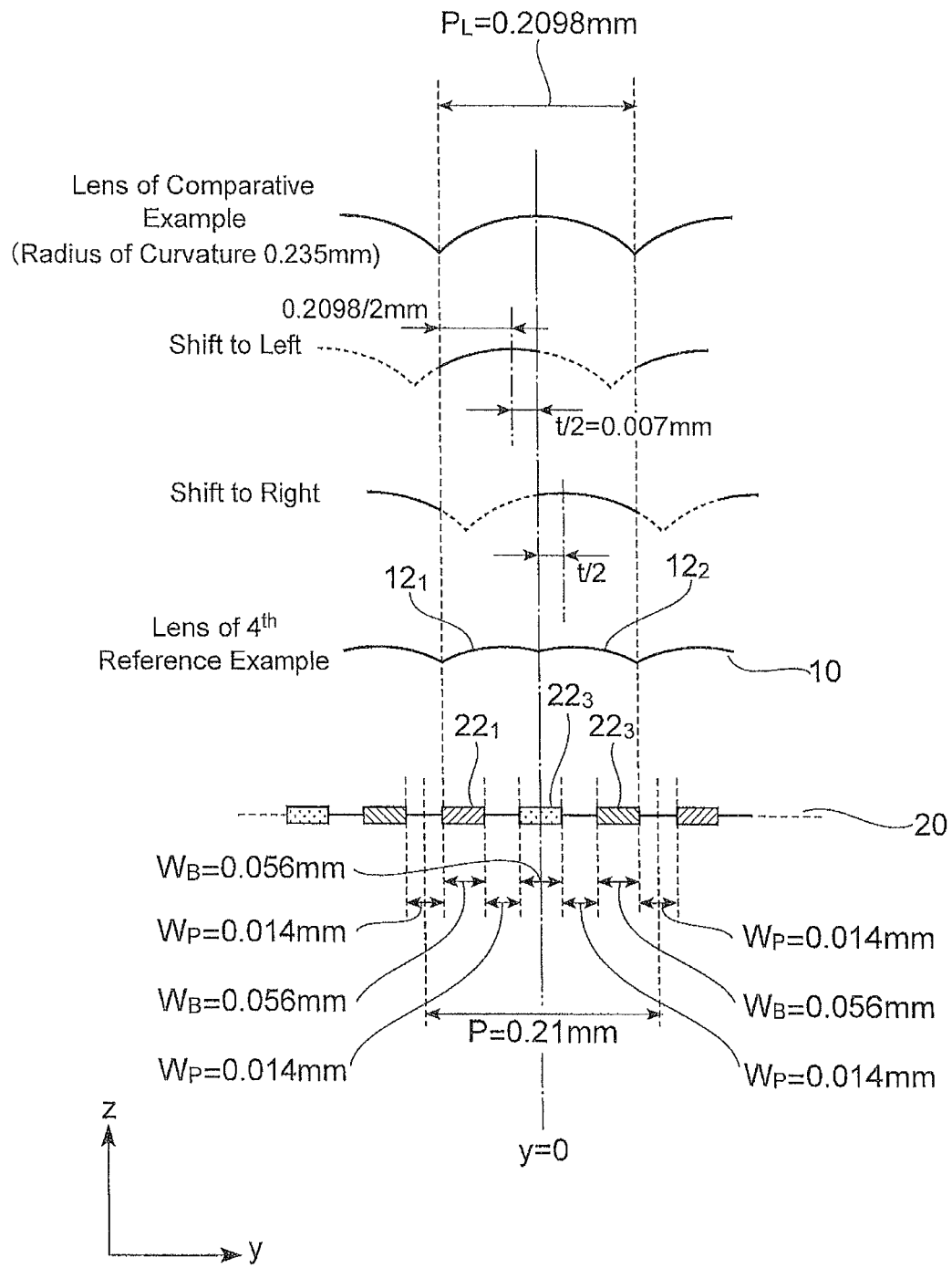
FIG. 22 is a diagram illustrating calculation conditions of a fourth reference example.
Figure 23:
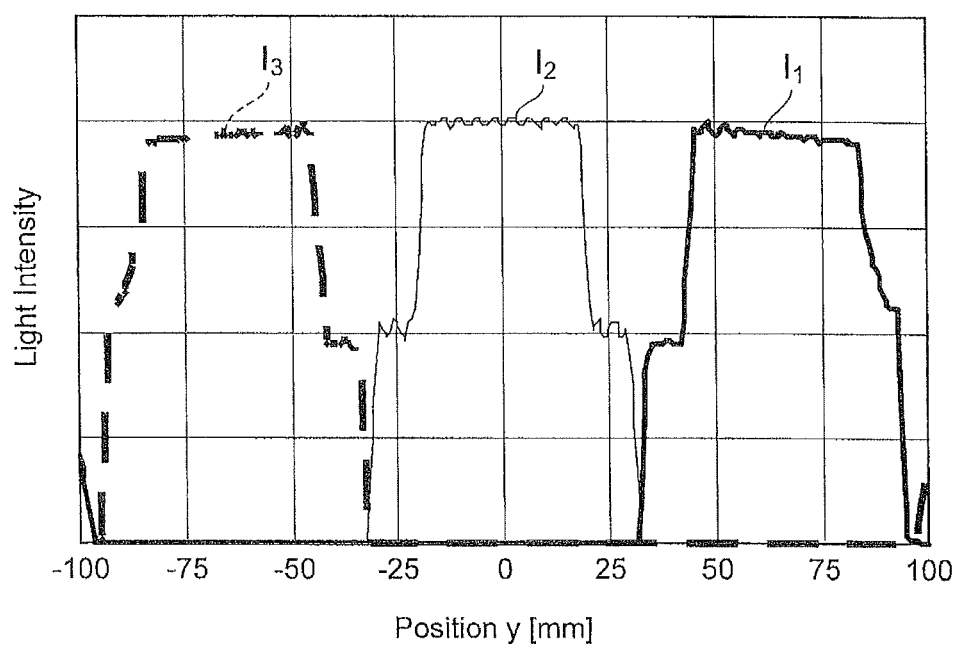
FIG. 23 is a chart illustrating calculation results of the fourth reference example.

FIG. 22 is a diagram illustrating calculation conditions of the fourth reference example. FIG. 23 is a chart illustrating calculation results of the fourth reference example. As illustrated in FIG. 22, the calculation conditions for parameters other than the form of the unit lens in the fourth reference example are the same as those of the second comparative example mentioned above. In the fourth reference example, a unit lens includes a partial lens $12_1$ corresponding to a part of the lens of the second comparative example shifted by t/2 in the −Y direction (leftward) and a partial lens $12_2$ corresponding to a part of the lens of the second comparative example shifted by t/2 in the +Y direction (rightward). Here, t/2=$W_B$/2=0.007 mm.

The partial lenses $12_1$, $12_2$ have respective optical axes which are parallel to the Z direction and separated from each other by the distance t. The center position in the Y direction of the respective optical axes of the partial lenses $12_1$, $12_2$ located at the center of the lens component 10 coincides with the center position in the Y direction of the unit pixel group located at the center of the display panel 20. The ratio of widths in the Y direction of the partial lenses $12_1$, $12_2$ is 1:1.

When all of the partial pixels $22_1$ to $22_3$ included in the 161 unit pixel groups of the display panel 20 are lit in the fourth reference example, the light intensity distribution on the image surface A is as illustrated in FIG. 23. On the image surface A, the areas $I_B$ where no light reaches are eliminated from between the images $I_1$ to $I_3$, whereby there are no black streaks when the images are observed. The light intensity changes stepwise depending on the position, so as to yield some areas with low light intensity, which are nonetheless much harder to be recognized by human eyes than the area seen black at the light intensity of 0.

The partial lenses included in the unit lenses, which have spherical lens forms in the comparative examples and reference mode explained in the foregoing, may have aspherical lens forms. When each of the partial lenses included in the unit lens has an aspherical lens form, light emitted from a point on a pixel can form an image into a spot having a diameter as small as possible on the image surface A. Since the lens extends in the X direction in the reference mode, the image can be formed into a line as thin as possible on the image surface A.

Figure 24:
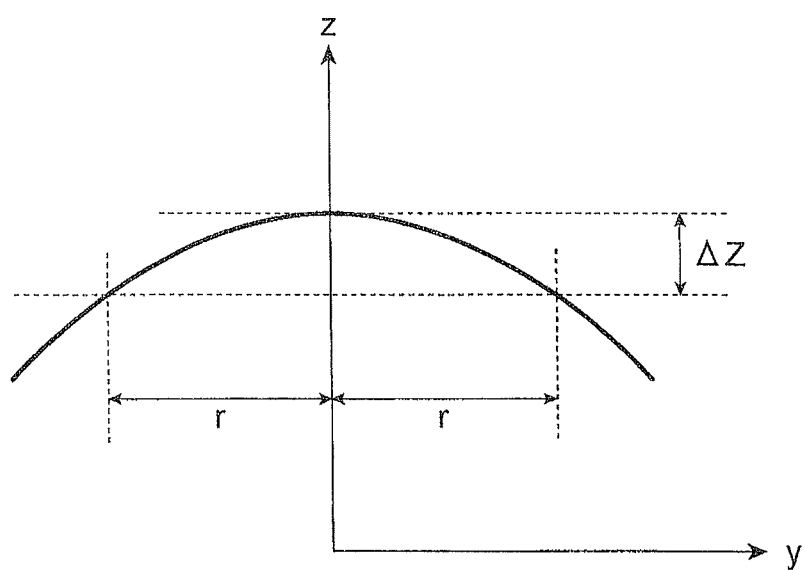
FIG. 24 is a diagram illustrating a cross-sectional form of an aspherical lens.

A case where each of the partial lenses included in the unit lens has an aspherical lens form will now be explained. FIG. 24 is a diagram illustrating a cross-sectional form of an aspherical lens. Assuming that the optical axis coincides with the Z axis, the form of the convex surface of the aspherical lens is represented by the following expression (12), where r is the distance from the optical axis, and Δz is the difference from the lens height when r=0. Here, c is the curvature, k is the conic constant, and $c_{2m}$ is the aspherical coefficient.

[Math. 12]

$$\Delta z = \frac{cr^2}{1 + \sqrt{1 - (1+k)c^2 r^2}} + \sum_{m=1} c_{2m} r^{2m} \qquad (12)$$

The lens parameters c, k, $c_{2m}$ can be optimized and determined by using commercially available lens designing software. Conditions for optimization may be such that, letting N be the number of unit pixel groups from the center unit pixel group to the outermost unit pixel group, the object height (the distance in the Y direction from the lens center to the farthest light emission point) is $N(P-P_L)+P/2$, for example, and the lens magnification is $L_1/L_2$.

The partial lenses included in the unit lenses in this reference mode can eliminate parts where no light reaches on the image surface by combining parts of lenses shifted from each other by the width t in the Y direction of the shielding region 23 in the case of aspherical lens forms as in the case of spherical lens forms, whereby black streaks which might appear on the screen can be eliminated while enhancing the quality of images.

Figure 25:
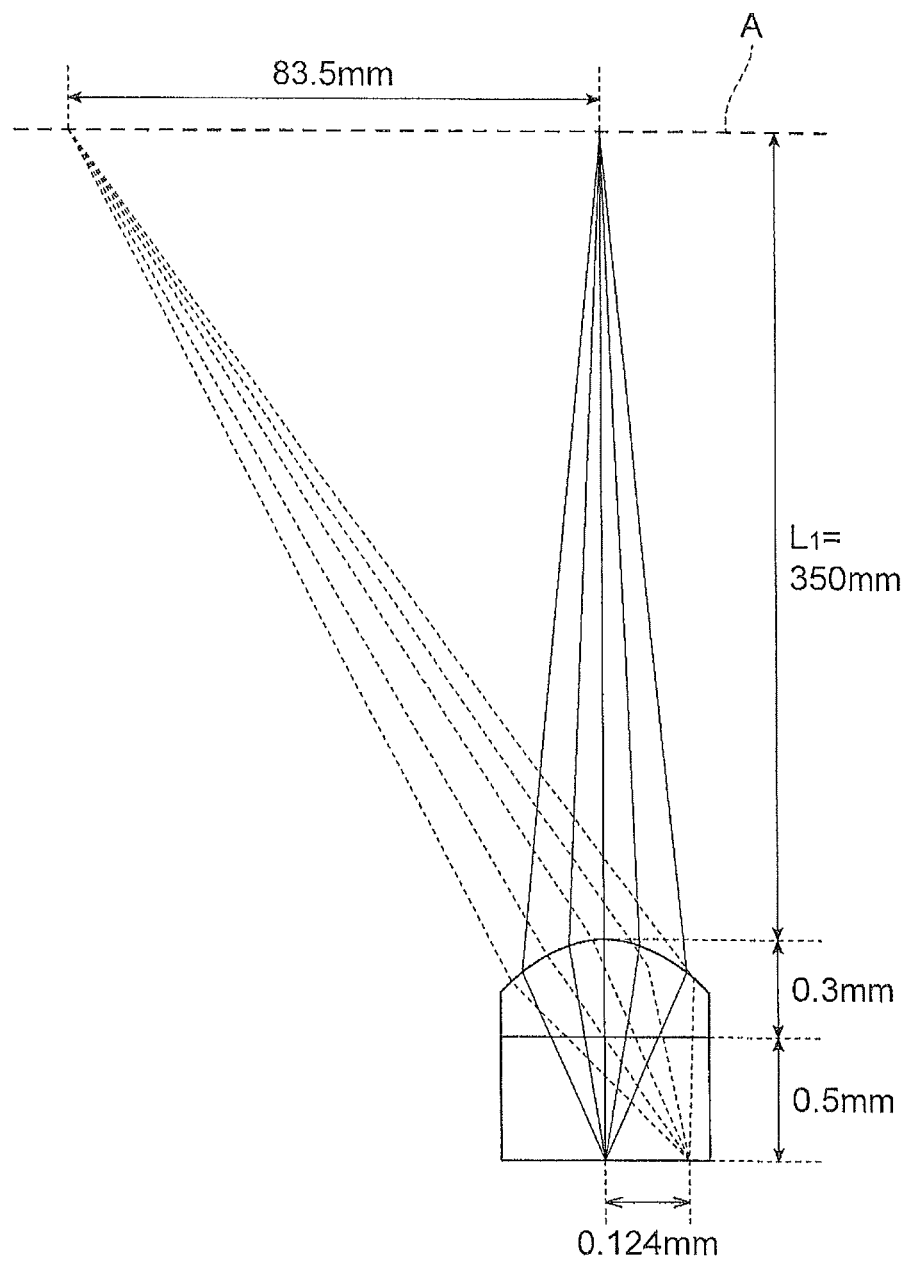
FIG. 25 is a diagram illustrating an optimization condition for the aspherical lens.

Parameters of an aspherical lens are calculated as follows. As illustrated in FIG. 25, in a lens system in which a lens having a refractive index of 1.6 and a thickness of 0.3 mm with a planar surface on one side and an aspherical convex surface on the other side is in close contact on the planar surface side with a parallel plate of glass having a refractive index of 1.5 and a thickness of 0.5 mm, a surface opposite from the glass surface in close contact with the lens is assumed to be a light source surface. For the object height0 of 0.124 mm (=80×(0.2−0.1997)+0.2/2), the distance $L_1$ between the principal plane on the exit side of the lens component 10 and the image surface A is 350 mm, and the distance $L_2$ between the principal plane on the entrance side of the lens component 10 and the display panel 20 is 0.52 mm. As a result of optimization under this condition, c=3.1 [mm$^{-1}$], k=−0.76, $c_4$=3.9, and $c_6$=−145.5. Each of $c_2$ and $c_{2m}$ (m≥4) is 0.

An example of calculating light intensity distributions on the image surface A in the fifth reference example in the case where each of partial lenses included in the unit lens is an aspherical lens will now be explained.

Figure 26:
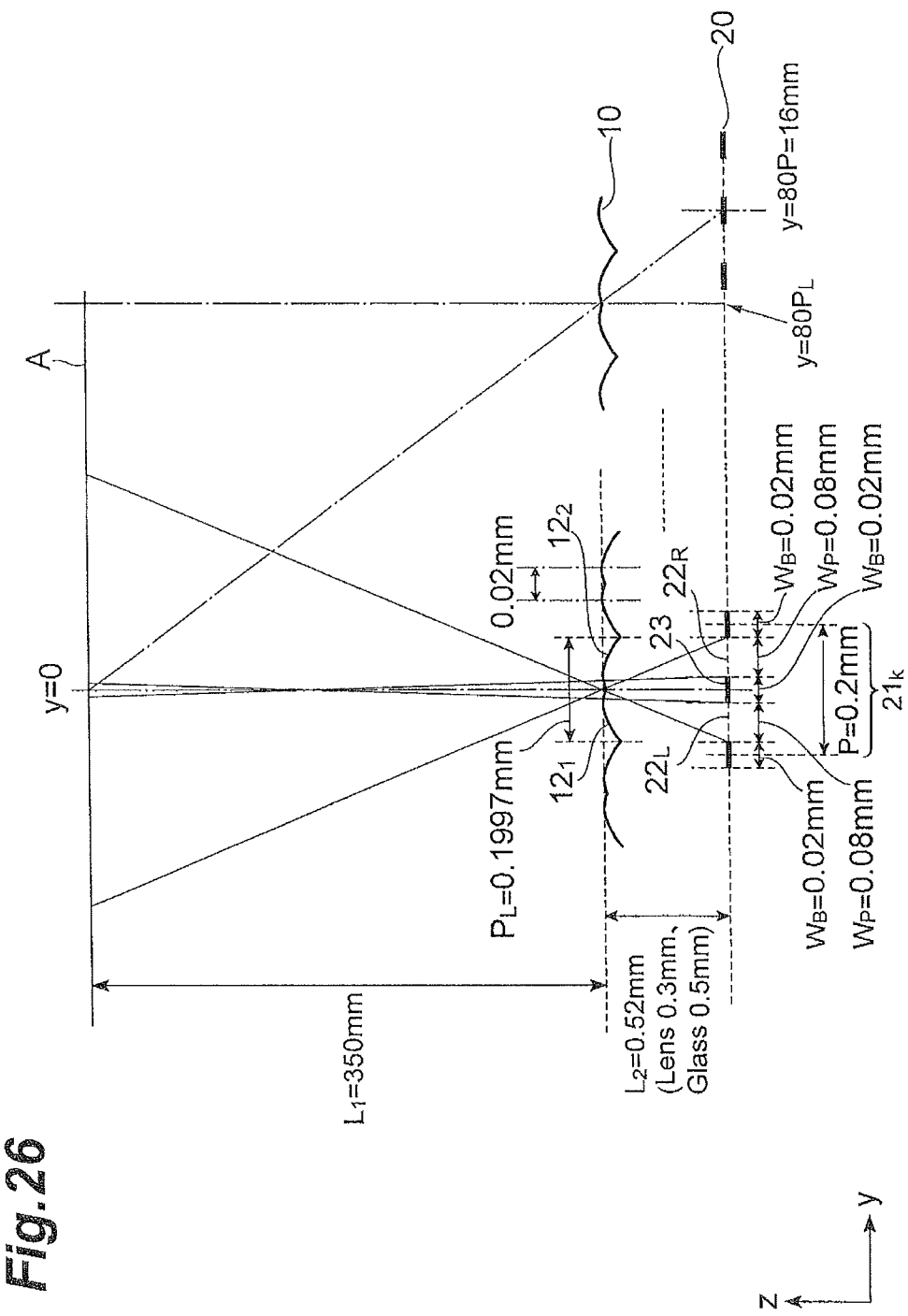
FIG. 26 is a diagram illustrating calculation conditions of a fifth reference example.
Figure 27:
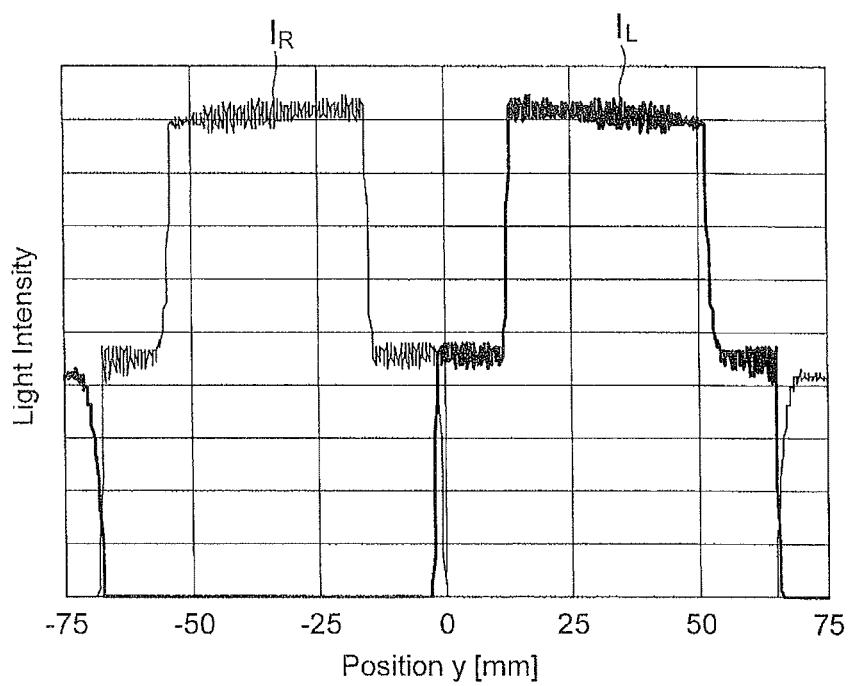
FIG. 27 is a chart illustrating calculation results of the fifth reference example.

FIG. 26 is a diagram illustrating calculation conditions of the fifth reference example. FIG. 27 is a chart illustrating calculation results of the fifth reference example. As illustrated in FIG. 26, the calculation conditions for parameters other than the form of the unit lens in the fifth reference example are the same as those of the second reference example mentioned above. In the fifth reference example, each of the partial lenses included in the unit lens has the aspherical lens form mentioned above.

When all of the partial pixels $22_L$, $22_R$ included in the 161 unit pixel groups of the display panel 20 are lit in the fifth reference example, the light intensity distribution on the image surface A is as illustrated in FIG. 27. On the image surface A, the area $I_B$ where no light reaches is eliminated from between the right- and left-eye images $I_R$, $I_L$, whereby there is no black streak when the images are observed. In the fifth reference example, the light intensity distribution on the image surface A is symmetrical about the position Y=0, whereby more natural images are obtained. The lens component 10 of the fifth reference example lacks discontinuous parts and thus is easier to manufacture.

The lens component 10 of the embodiment will now be explained in comparison with the lens component 10 of the reference mode. The lens component 10 of the reference mode explained in the foregoing is superior to those of the comparative examples in that it can inhibit the quality of images from deteriorating, but is less easier to manufacture. That is, the lens component 10 of the reference mode has a depression between the partial lenses $12_1$, $12_2$ included in each unit lens 11 in the XY cross section, so that a die used for manufacturing it is not easy to process. The lens component 10 of the embodiment explained in the following exhibits an image deterioration suppression effect on a par with that of the lens component 10 of the reference mode and also can be manufactured easily.

Figure 28:
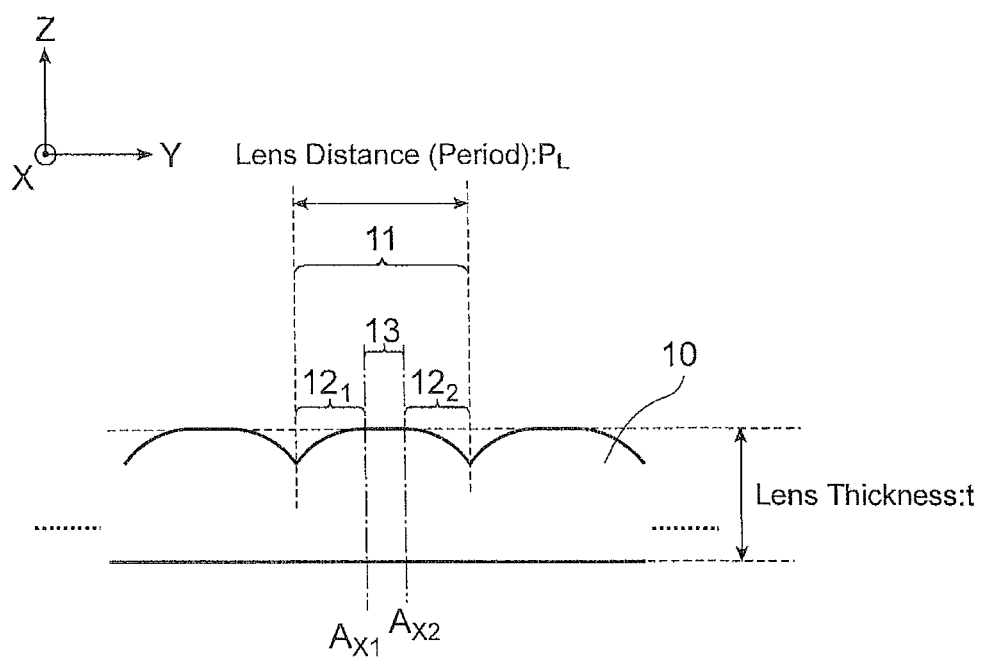
FIG. 28 is a sectional view of the lens component 10 in accordance with an embodiment.
Figure 29:
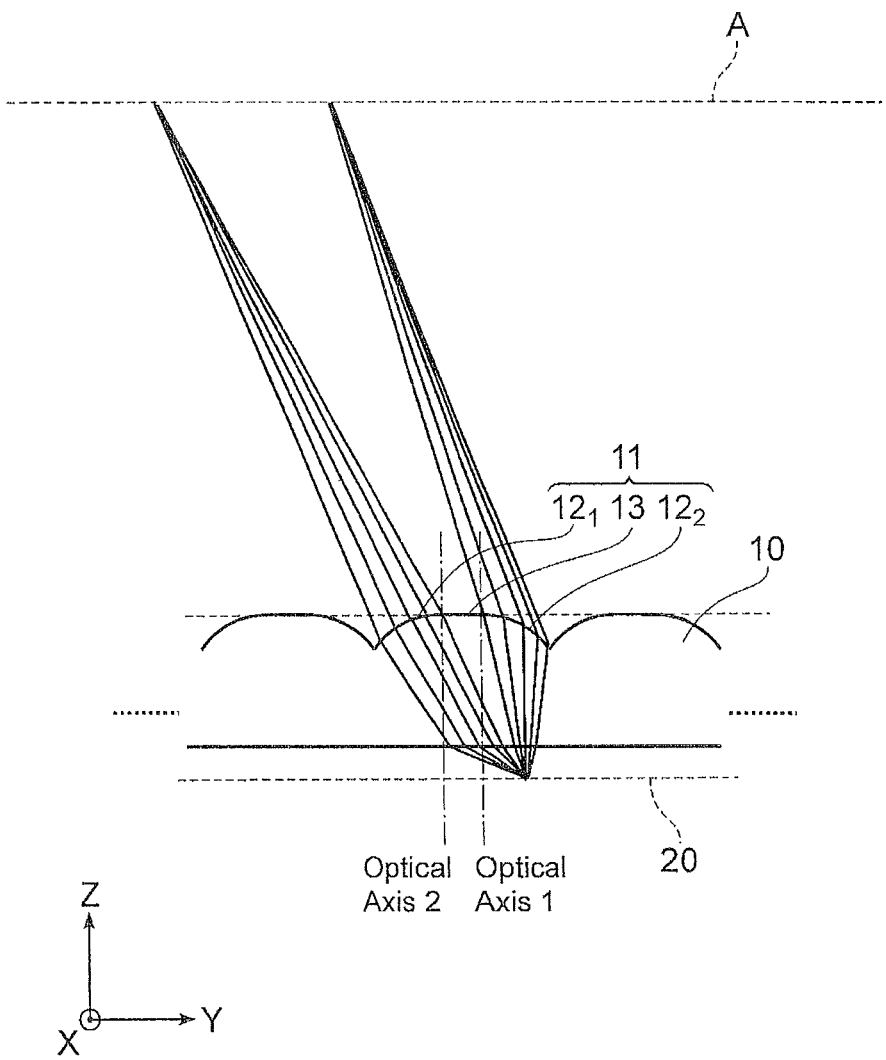
FIG. 29 is a diagram explaining image formation by the lens component 10 in accordance with the embodiment.

FIG. 28 is a sectional view of the lens component 10 of the embodiment. FIG. 29 is a diagram explaining image formation by the lens component 10 in accordance with the embodiment. The lens component 10 of this embodiment comprises K unit lenses 11, each extending in the X direction and having a common structure, arranged in parallel at the minimum period $P_L$ in the Y direction. Each unit lens 11 includes two partial lenses $12_1$, $12_2$ sectioned within the minimum period $P_L$ in the Y direction. It further includes a flat part 13 disposed between the partial lenses $12_1$, $12_2$. The partial lenses $12_1$, $12_2$ included in each unit lens 11 have respective optical axes $A_{x1}$, $A_{x2}$ different from each other but parallel to the Z direction and form images of a common point on the object surface onto the image surface A at respective positions different from each other. The distance between the respective image forming positions by the partial lenses $12_1$, $12_2$ depends on the lens magnification a and the distance between the optical axes $A_{x1}$, $A_{x2}$. The partial lenses $12_1$, $12_2$ have the same focal length.

FIG. 29 schematically illustrates optical paths of only light beams passing through the partial lenses $12_1$, $12_2$ in light beams emitted from a common point on the object surface. In the light beams emitted from the common point on the object surface, those passing through the flat part 13, which are not illustrated in FIG. 29, reach the image surface A so as to be distributed between two image forming points thereon. The light having reached the image surface A through the flat part 13 becomes noise with respect to the image forming light but its light quantity per area is sufficiently smaller than that of the image forming light. This noise is not a problem as long as the flat part 13 is not too large for the partial lenses $12_1$, $12_2$. There will be no problem if the length of the flat part 13 occupies 0.5 or less of the period $P_L$ in the cross-sectional form illustrated in FIG. 28.

Figure 30:
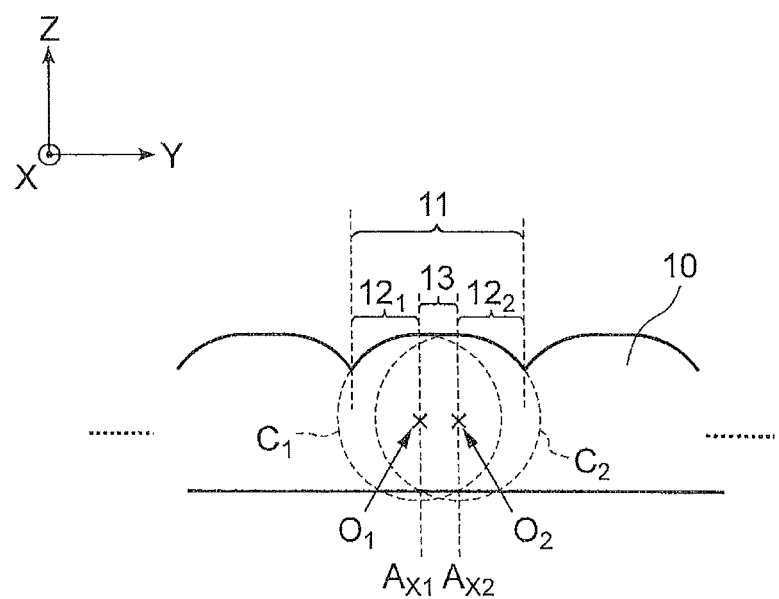
FIG. 30 is a sectional view explaining the form of the lens component 10 in accordance with the embodiment.

The partial lenses $12_1$, $12_2$ included in each unit lens 11 can be constructed by forms of parts of cylindrical lenses having the same shape as illustrated in FIG. 30. In the cross-sectional view illustrated in FIG. 30, circles $C_1$, $C_2$ have the same radius of curvature with their respective centers $O_1$, $O_2$ located on the optical axes $A_{x1}$, $A_{x2}$. The partial lenses $12_1$, $12_2$ are respective parts of cylindrical forms constructed by arcs.

With reference to FIGS. 31 to 39, examples of calculating light intensity distributions on the image surface A in the third comparative example and first, second, and third examples will now be explained. The first example is a specific example of the above-mentioned embodiment. The lens is assumed to be a spherical lens in the following examples of calculations.

Figure 31:
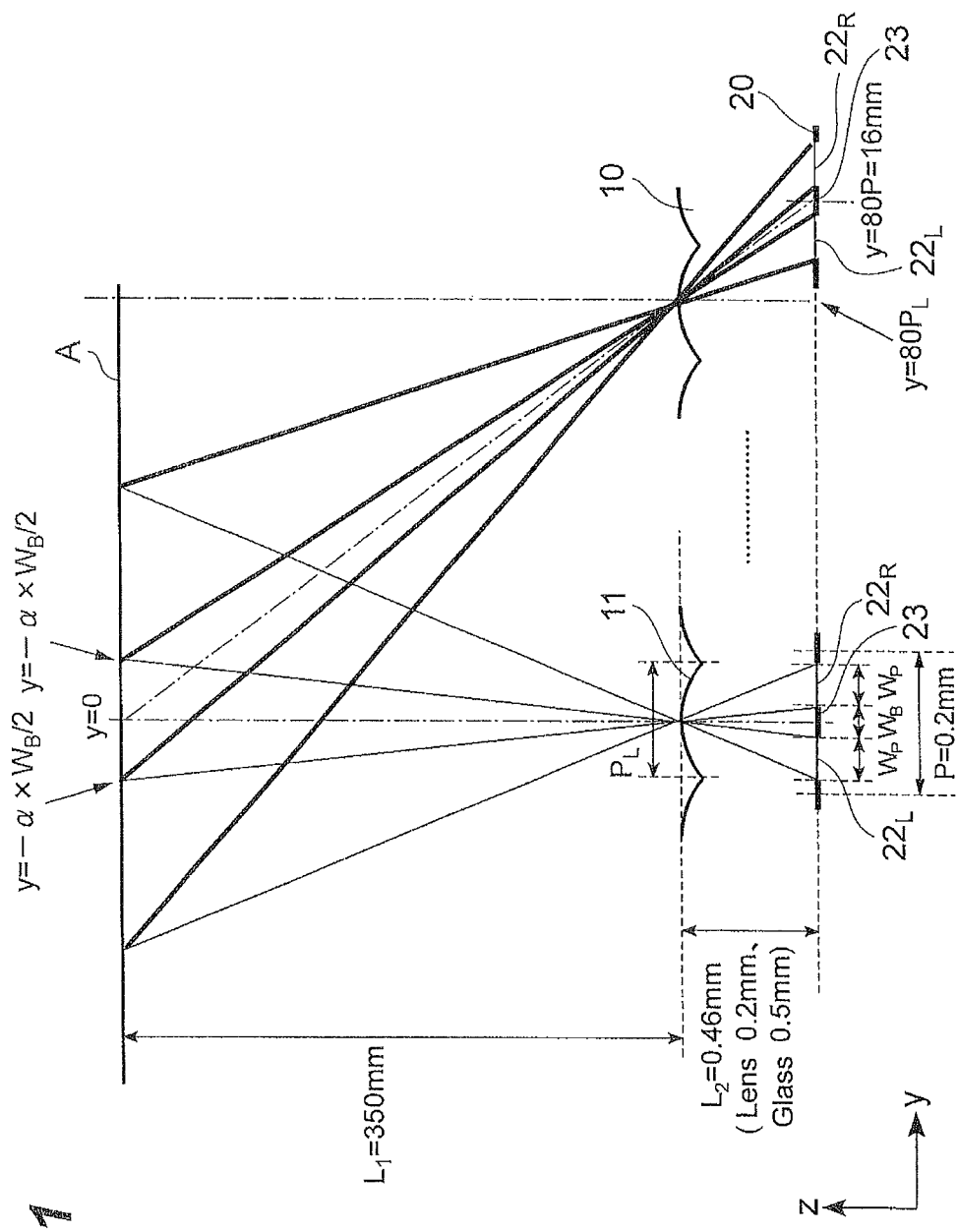
FIG. 31 is a diagram illustrating calculation conditions of a third comparative example.
Figure 32:
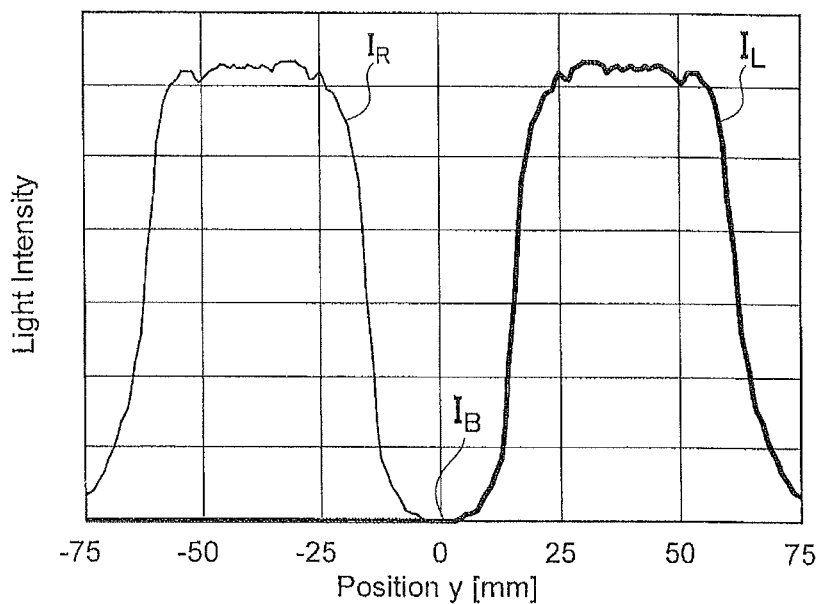
FIG. 32 is a chart illustrating calculation results of the third comparative example.

FIG. 31 is a diagram illustrating calculation conditions of the third comparative example. FIG. 32 is a chart illustrating calculation results of the third comparative example. In the third comparative example, the width P in the Y direction of a unit pixel group is 0.2 mm as illustrated in FIG. 31. The width $W_P$ in the Y direction of each of the partial pixels included in the unit pixel group is 0.06 mm. The width $W_B$ in the Y direction of the shielding region 23 between the partial pixels included in the unit pixel group is 0.04 mm.

The distance $L_1$ between the principal plane on the exit side of the lens and the image surface A is 350 mm. The distance $L_2$ between the principal plane on the entrance side of the lens and the display panel 20 is 0.46 mm. The thickness of the lens is 0.2 mm. The refractive index of the lens is 1.6. Assuming that a glass sheet having a thickness of 0.5 mm and a refractive index of 1.5 exists between the lens and the display panel 20, the distance $L_2$ is 0.46 mm (=0.2/1.6+0.5/1.5). Polarizers and adhesives, which may exist between the lens and the display panel 20 in practice, are neglected.

The ray matrix is solved by using these values of parameters, whereby the radius of curvature of the lens is calculated as 0.27 mm. The display panel 20 is assumed to have a width of 32.2 mm in the Y direction thereof and comprise 161 unit pixel groups.

In FIG. 31, the outermost unit pixel group located at Y=80P=16 mm is the 80th unit pixel group counted from the unit pixel group located at the center (Y=0). For substantially superposing the respective images having arrived from the unit pixel groups on the image surface A, the image at the center position of the 80th unit pixel group located at Y=80P is placed at the position Y=0 on the image surface A through the 80th lens located at $Y=80P_L$. From the similarity between triangles as mentioned above, the width $P_L$ in the Y direction of the unit lens is calculated as 0.1997 mm.

When all of the partial pixels $22_L$, $22_R$ included in the 161 unit pixel groups of the display panel 20 are lit in the third comparative example, the light intensity distribution on the image surface A is as illustrated in FIG. 32. The area $I_B$ where no light reaches exists between the right- and left-eye images $I_R$, $I_L$ on the image surface A. The black area $I_B$ for the shielding region 23 is formed within the range in the Y direction represented by the above-mentioned expression (3).

Figure 33:
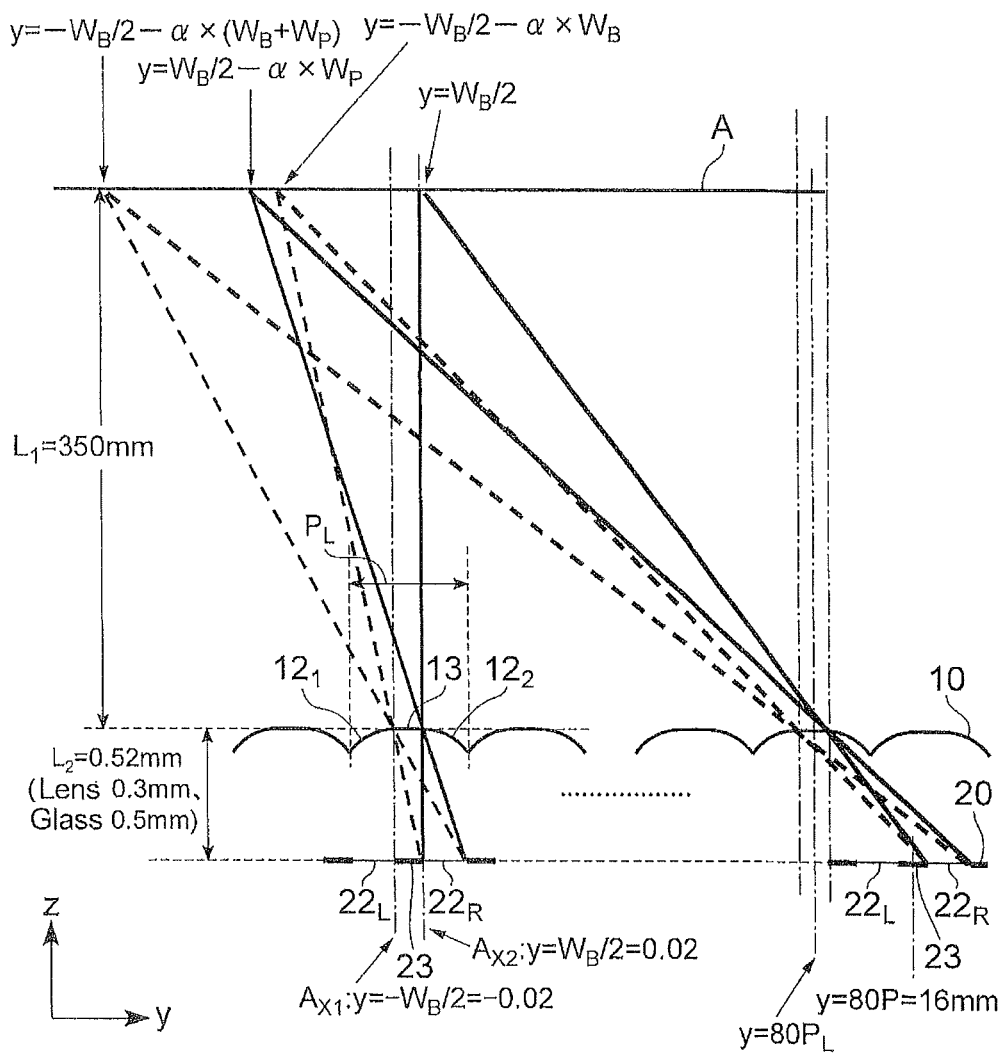
FIG. 33 is a diagram illustrating calculation conditions of a first example.
Figure 34:
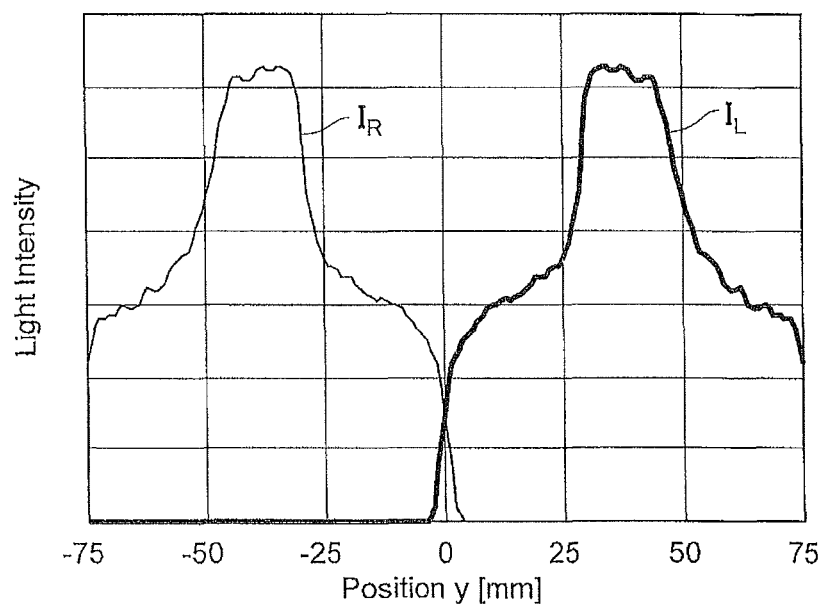
FIG. 34 is a chart illustrating calculation results of the first example.

FIG. 33 is a diagram illustrating calculation conditions of the first example. FIG. 34 is a chart illustrating calculation results of the first example. As illustrated in FIG. 33, the calculation conditions for parameters other than the form of the unit lens in the first example are the same as those of the third comparative example mentioned above. In the first example, each unit lens 11 includes the partial lenses $12_1$, $12_2$ and the flat part 13. The distance between the respective optical axes of the partial lenses $12_1$, $12_2$ included in each unit lens 11 is 0.04 mm, which is equal to the width $W_B$ in the Y direction of the shielding region 23 between the partial pixels included in the unit pixel group. The slope of a tangent to the lens surface on the YZ plane is made continuous within the unit lens plane. Each partial lens has a radius of curvature of 0.27 mm and a width in the Y direction of 0.07985 mm.

Light issued from a given object point on the object surface forms an image on the image surface A separated from the optical axis on the side opposite from the object point by the distance between the point and the optical axis multiplied by a. The right-eye image $I_R$ produced by light issued from the right-eye partial pixel $22_R$ is formed by the partial lenses $12_1$ and $12_2$ within the ranges in the Y direction represented by the following expressions (13) and (14), respectively, and in total within the range in the Y direction represented by the following expression (15). The left-eye image $I_L$ produced by light issued from the left-eye partial pixel $22_L$ is formed in total within the range in the Y direction represented by the following expression (16). Hence, there is no area where no light reaches on the image surface A.

[Math. 13]
$$-\frac{W_B}{2} - \alpha(W_B + W_P) < Y < -\frac{W_B}{2} - \alpha W_B \quad (13)$$

[Math. 14]
$$\frac{W_B}{2} - \alpha W_P < Y < \frac{W_B}{2} \quad (14)$$

[Math. 15]
$$-\frac{W_B}{2} - \alpha(W_B + W_P) < Y < \frac{W_B}{2} \quad (15)$$

[Math. 16]
$$-\frac{W_B}{2} < Y < \frac{W_B}{2} + \alpha(W_B + W_P) \quad (16)$$

When all of the partial pixels $22_L$, $22_R$ included in the 161 unit pixel groups of the display panel 20 are lit in the first example, the light intensity distribution on the image surface A is as illustrated in FIG. 34. On the image surface A, the area $I_B$ where no light reaches is eliminated from between the right- and left-eye images $I_R$, $I_L$, whereby there is no black streak when the images are observed.

Figure 35:
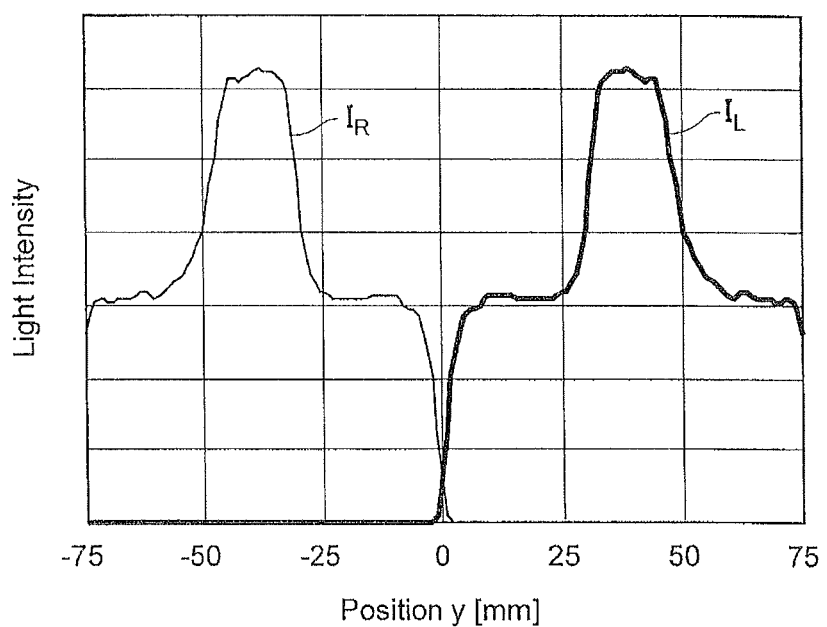
FIG. 35 is a chart illustrating calculation results obtained when excluding a flat part 13 from the structure of the first example.

In the case where the flat part 13 is excluded from the structure of the first example so that the partial lenses $12_1$, $12_2$ extend to the center while retaining the same curvature (in the structure of the reference mode), the light intensity distribution on the image surface A is as illustrated in FIG. 35. Results of calculations of the first example illustrated in FIG. 34, though slightly different from those of FIG. 35 in terms of the intensity distribution, can be said to exhibit sufficient performances, since they have no region with a light intensity of 0 near y=0 mm while keeping viewpoint separation in lateral directions.

Figure 36:
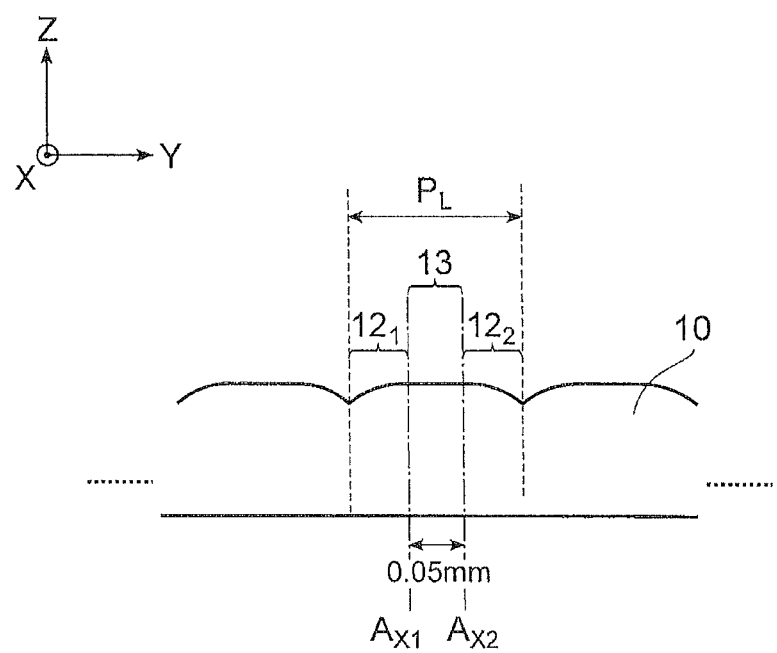
FIG. 36 is a diagram illustrating calculation conditions of a second example.
Figure 37:
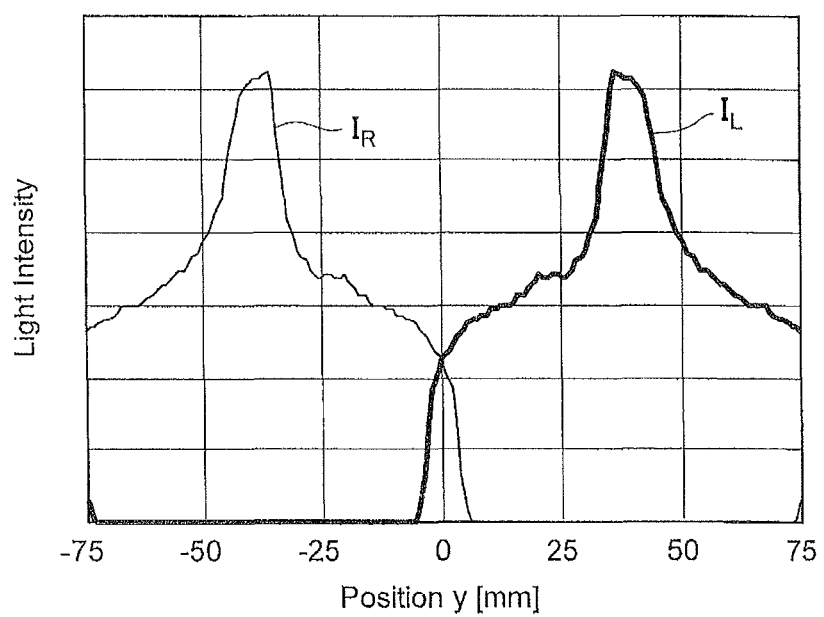
FIG. 37 is a chart illustrating calculation results of the second example.

FIG. 36 is a diagram illustrating calculation conditions of the second example. FIG. 37 is a chart illustrating calculation results of the second example. The second example differs from the first example in that the distance between the respective optical axes $A_{x1}$, $A_{x2}$ of the partial lenses $12_1$, $12_2$ is 0.05 mm and that the width in the Y direction of the flat part 13 is 0.05 mm. As compared with the first example, the second example yields a greater amount of overlap between the right- and left-eye images $I_R$, $I_L$ near y=0 on the image surface A and thus can more effectively eliminate black streaks.

Figure 38:
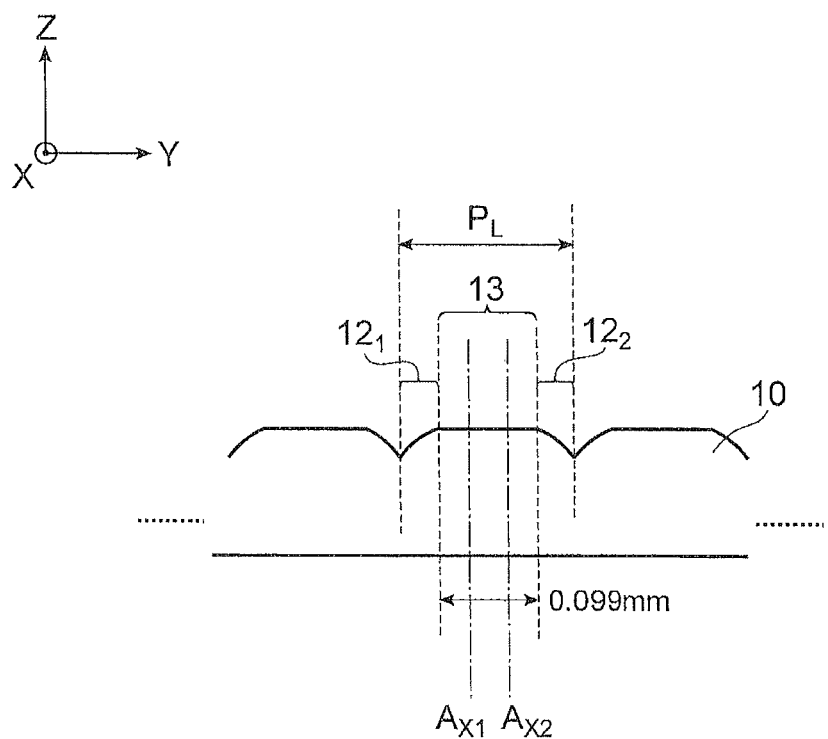
FIG. 38 is a diagram illustrating calculation conditions of a third example.
Figure 39:
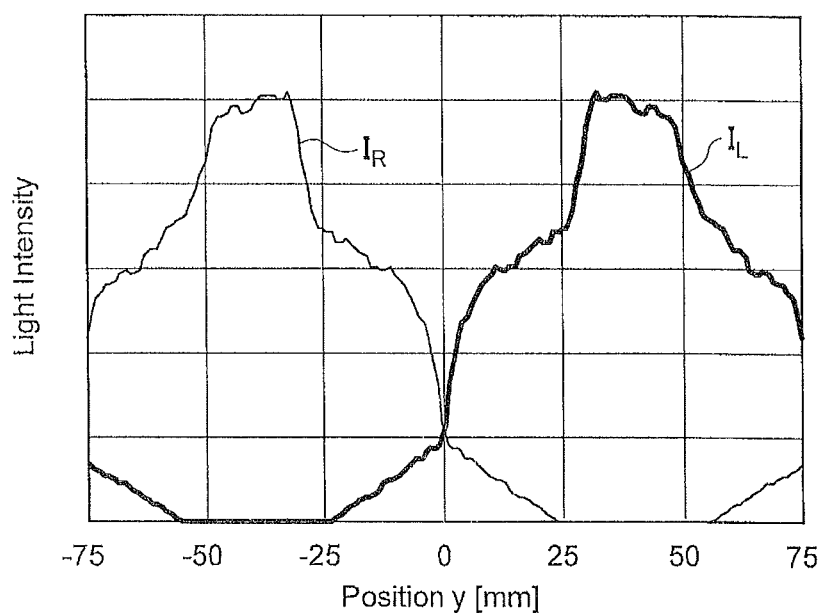
FIG. 39 is a chart illustrating calculation results of the third example.

FIG. 38 is a diagram illustrating calculation conditions of the third example. FIG. 39 is a chart illustrating calculation results of the third example. The third example differs from the first example in that the width in the Y direction of the flat part 13 is 0.099 mm while the distance between the respective optical axes $A_{x1}$, $A_{x2}$ of the partial lenses $12_1$, $12_2$ is kept at 0.04 mm. As with the first and second examples, the third example can let the right- and left-eye images $I_R$, $I_L$ overlap each other near y=0 on the image surface A, thereby eliminating black streaks. The third example yields a considerably large amount of overlap between the right- and left-eye images $I_R$, $I_L$, which is also the amount of intrusion of one viewpoint into the other viewpoint and slightly worsens crosstalk. However, a typical human interocular distance is 60 to 65 mm, so that light of the other viewpoint does not enter near the position of one eye where y=±30 to 32.5 mm, whereby this example can be used for a three-dimensional image display device.

When the distance between the optical axes of the partial lenses $12_1$, $12_2$ is equal to or greater than the width $W_B$ of the shielding region 23 as in the above-mentioned first to third examples, the right- and left-eye images $I_R$, $I_L$ overlap each other near y=0 on the image surface A, whereby black streaks can be eliminated.

Figure 40:
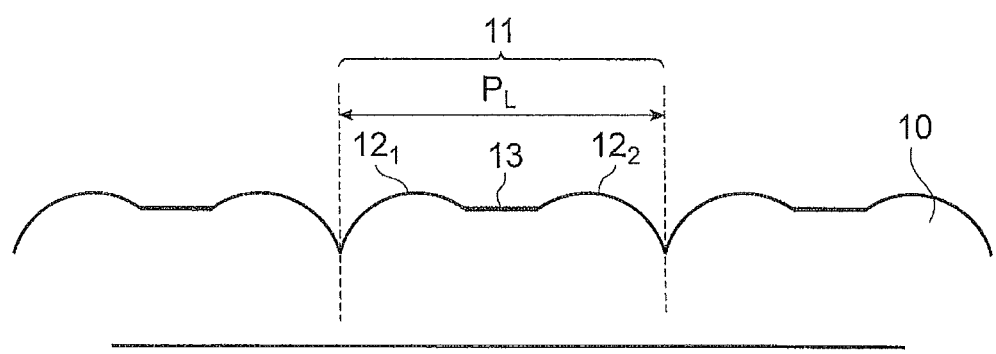
FIG. 40 is a sectional view explaining another form example of the lens component 10 of the embodiment.

The lens component 10 of the embodiment may have a structure with a cross section illustrated in FIG. 40, i.e., a structure in which the lateral width of the flat part 13 is narrower than the distance between the optical axes of the partial lenses $12_1$, $12_2$. Even the lens component 10 having such a structure can be manufactured more easily than the lens component 10 of the reference mode. As a structure which can be manufactured more easily, it is preferred for the width in the Y direction of the flat part 13 to be equal to or greater than the distance between the respective optical axes of the partial lenses $12_1$, $12_2$ in each unit lens.

On the other hand, light passing through the flat part 13 becomes noise light not contributing to image formation, so that the noise light increases when the width in the Y direction of the flat part 13 is too large. Therefore, the width in the Y direction of the flat part 13 in each unit lens 11 is preferably smaller than ½ of the width $P_L$ in the Y direction of the unit lens 11.

Since the light passing through the flat part 13 becomes only the noise light, it is not necessary for the flat part 13 to strictly control the advancing direction of the light having passed therethrough. Therefore, the flat part 13 is not required to be a complete plane but may have a surface roughness of about 10 times the wavelength or less, for example, without problems. The flat part 13 may be a curved surface having a radius of curvature greater than that of the partial lenses $11_1$, $11_2$. When each of the partial lenses $11_1$, $11_2$ is an aspherical lens, the flat part 13 may be a curved surface having a radius of curvature greater than the minimum value of radius of curvature of the aspherical lens. It will be sufficient if the flat part 13 forms no image of light issued from the object surface onto the image surface A.

Figure 41:
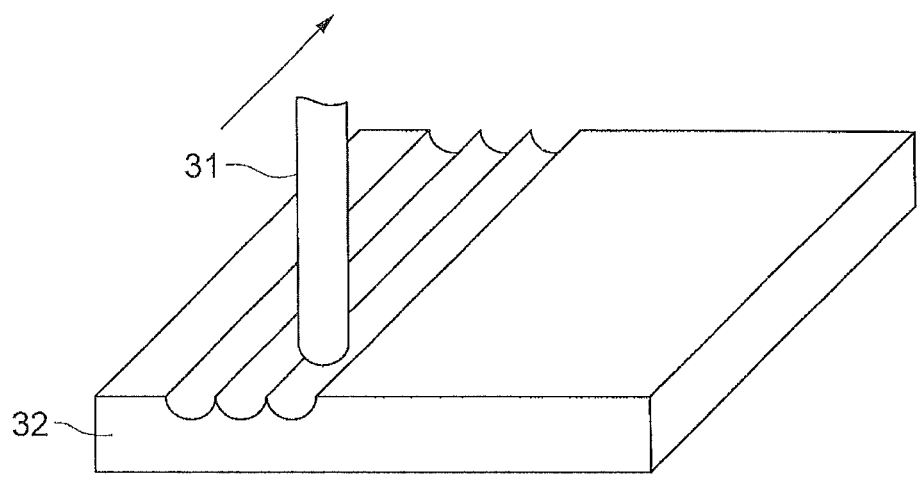
FIG. 41 is a diagram schematically explaining a method of making a die.
Figure 42:
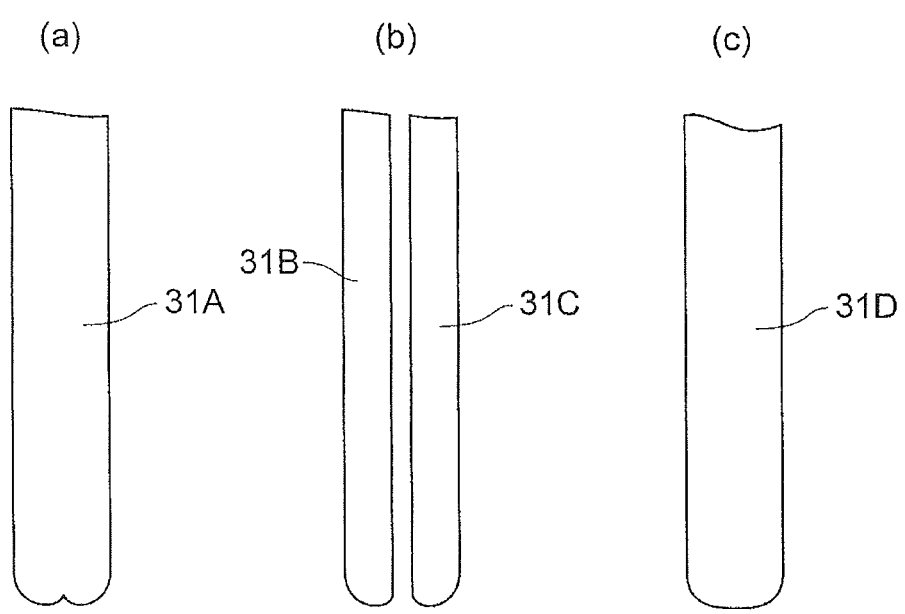
FIG. 42 is a set of diagrams explaining forms of cutting tools used for making the die.

Methods of manufacturing the lens component 10 in the comparative examples, reference mode, and embodiment will now be explained. The lens component 10 is manufactured by making a die having a form reversing projections and depressions of the lens surface of the lens component 10 and then letting a molten material flow into the die and pressing it with a flat plate from thereabove or letting the molten material flow over the flat plate and then pressing it with the die from thereabove. FIG. 41 is a diagram schematically illustrating a method of making a die. FIG. 42 is a set of diagrams explaining forms of cutting tools used for making the die. A cutting tool 31 is constructed by a main part and a blade edge (not depicted), while the blade edge is brazed to the leading end of the main part so as to be integrated therewith. The blade edge can be constituted by a hard material such as diamond. The cutting tool 31 is movable in a predetermined direction while being held with a shank which is not depicted. The cutting tool 31 is moved in the direction of arrow in the drawing, so as to form a plurality of grooves arranged at the period $P_L$ on one principal plane of a flat plate 32.

Since the depth cut by a single line processing operation with the cutting tool 31 is limited, m (which is typically 3 though depending on the depth) line processing operations are required for forming one groove. For manufacturing the lens component 10 comprising n (which is typically several hundred or more) unit lenses 11, the die also necessitates n grooves. Hence, m×n line processing operations are necessary in total. Such a cutting tool 31 is made by polishing.

The leading end (blade edge) of the cutting tool 31 has the same form as with the unit lens 11. The cutting tool 31 used for making a die for manufacturing the lens components 10 of the comparative examples has its leading end provided with one projection. A cutting tool 31A for making a die for manufacturing the lens component 10 of the reference mode has its leading end provided with a depression between two projections as illustrated in FIG. 42(a). The cutting tool 31A having such a form can be produced by polishing the leading end (blade edge) of the cutting tool 31. However, the leading end (blade edge) of the cutting tool 31, which has a small size and is constructed by a hard material, is difficult for normal polishing to produce and requires a special technique to make, whereby its manufacture is not easy but becomes expensive. Two cutting tools 31B, 31C illustrated in FIG. 42(b) may be used in place of the cutting tool 31A. This, however, not only increases the number of cutting tools required, but also doubles the number of line processing operations at the time of making the die, thereby incurring a twofold increase in the cost of manufacturing the die. Further, the boundary between the two cutting tools leaves a streak-like unprocessed area in thus produced die, thereby worsening optical characteristics of unit lenses.

The cutting tool 31D used for making the die for manufacturing the lens component 10 of the embodiment has no depression in its leading end as illustrated in FIG. 42(c) and thus can be produced by normal polishing as with the typical cutting tool 31. Therefore, the lens component 10 of the embodiment can be manufactured easily at the same cost as with typical lenticular lenses.

In the embodiment, as in the reference mode, the number of viewpoints may be 2 or more in general, while each of the partial lenses included in the unit lens may have an aspherical lens form.

Figure 43:
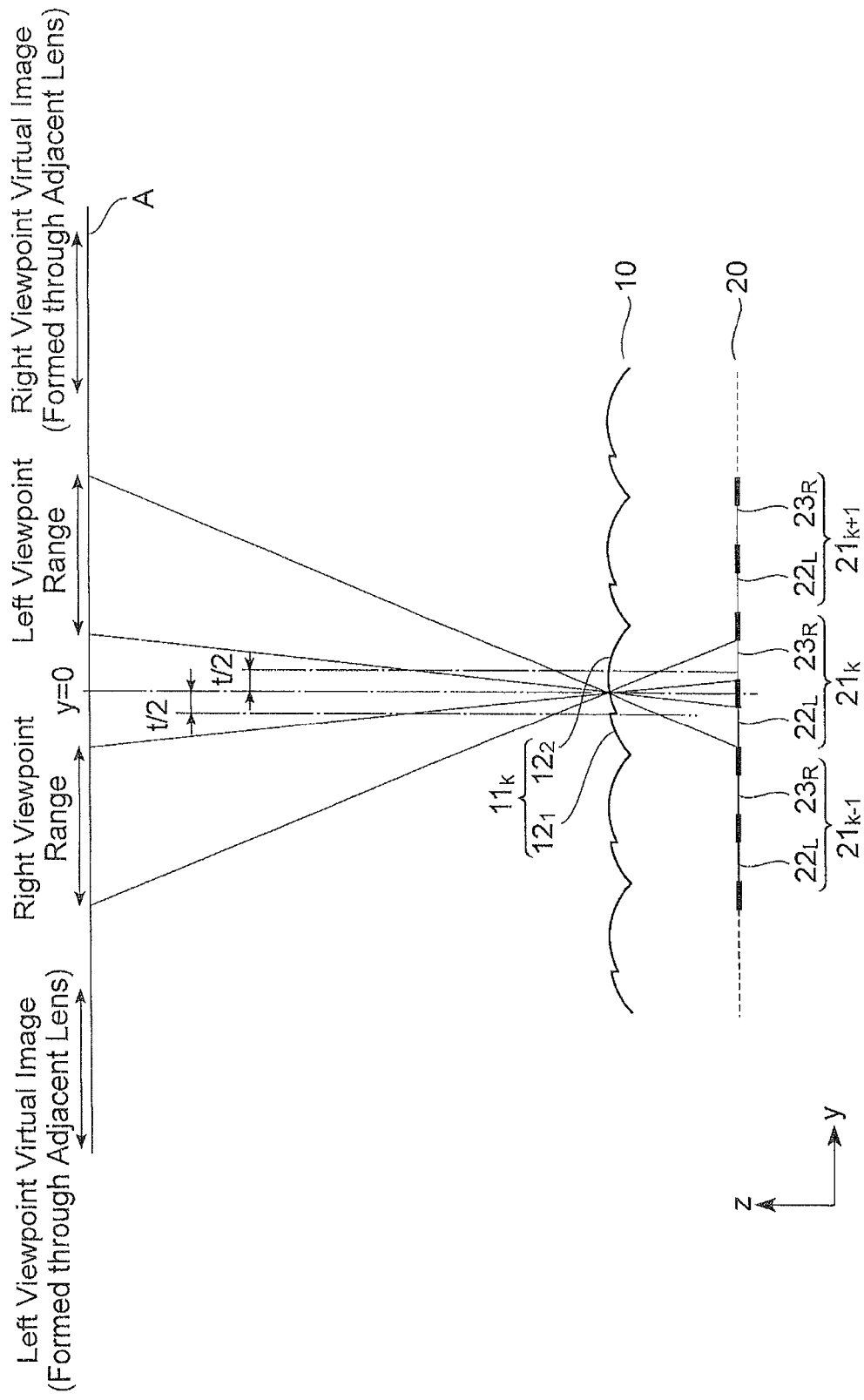
FIG. 43 is a diagram illustrating a positional relationship between a unit lens and a unit pixel group at a center of the image display device in accordance with the embodiment.

The case of making three-dimensional images visually recognizable is mainly explained in the foregoing. In an image display device which displays three-dimensional images or is not aimed at sorting viewpoints asymmetrically, respective images of viewpoints are preferably formed laterally evenly when seen at the center front of the display device as illustrated in FIG. 43. FIG. 43 is a diagram illustrating a positional relationship between a unit lens and a unit pixel group at a center of the image display device in accordance with the embodiment.

As illustrated in FIG. 43, assuming that the negative and positive directions with respect to the center position (Y=0) in the Y direction are right and left viewpoints, respectively, on the image surface A, the center of the medial unit pixel group $21_k$ on the display panel 20 is located at Y=0. Since a pixel and an image are the reverse of each other, it is necessary for the left- and right-eye partial pixels $22_L$, $22_R$ to be arranged on the negative and positive sides, respectively. When they shift greatly, virtual image parts on the outside of both viewpoints may be seen and, if the right- and left-eye partial pixels completely replace each other, the right and left images may switch their places with each other. Hence, it is desirable that the midpoint in the Y direction of the respective optical axes of two partial lenses included in a given unit lens located near the center in the Y direction of the lens component and the center position of a given unit pixel group located near the center in the Y direction of the display panel 20 be equal to each other.

For achieving a desirable positional relationship between the unit lens 11 and the unit pixel group $21_k$ as illustrated in FIG. 43, it is preferred for the lens component 10 and the display unit 20 to be assembled while verifying their positions by displaying images. It will also be preferable if, as illustrated in FIG. 44, the lens component 10 and the display panel 20 have positioning marks 14, 24 at edges, respectively, and are assembled such that the marks 14, 24 coincide with each other.

INDUSTRIAL APPLICABILITY

The present invention is utilizable as an image display device which can display images respectively to a plurality of viewpoints, inhibit the images from lowering their quality, and be manufactured easily and a lens component included in the image display device.

REFERENCE SIGNS LIST 1, 2 . . . image display device; 10 . . . lens component; 11 . . . unit lens; 12 . . . partial lens; 13 . . . flat part; 20 . . . display panel; $21_k$ . . . unit pixel group; 22 . . . partial pixel; 23 . . . shielding region

The invention claimed is:

1. An image display device comprising:
a display panel having a plurality of unit pixel groups arranged two-dimensionally on a plane parallel to both of first and second directions perpendicular to each other, each of the plurality of unit pixel groups including N partial pixels arranged along the second direction, where N is an integer of 2 or greater; and
a lens component provided with unit lenses corresponding to the unit pixel groups in the second direction, the lens component forming an image on the display panel as an object surface onto an image surface,
wherein the lens component comprises K unit lenses, each extending in the first direction and having a common structure, arranged in parallel at a minimum period $P_L$ in the second direction perpendicular to the first direction,
wherein each of the K unit lenses includes M partial lenses sectioned within the minimum period $P_L$ in the second direction and a flat part disposed between the M partial lenses, where each of K and M is an integer of 2 or greater,
wherein each of the M partial lenses is a portion of a circle having an axis that passes through a center of the circle, each of the axes of the circles of the M partial lenses being different from each other but parallel to a third direction perpendicular to both of the first and second directions, the M partial lenses forming an image of a common point on the object surface onto the image surface at respective positions different from each other, and
wherein the flat part of each unit lens faces the image surface.

2. The image display device according to claim 1, wherein, in each unit lens, the flat part has a width in the second direction equal to or smaller than a distance in the second direction between the respective optical axes of the M partial lenses.

3. The image display device according to claim 1, wherein, in each unit lens, the flat part has a width in the second direction smaller than ½ of that in the second direction of the unit lens.

4. The image display device according to claim 1, wherein the M partial lenses included in each unit lens have the same focal length.

5. The image display device according to claim 1, wherein, in each of the plurality of unit pixel groups in the display panel, a shielding region exists between N partial pixels along the second direction; and
wherein the width of the shielding region in the second direction is equal to or smaller than a distance in the second direction between the respective optical axes of the M partial lenses included in each unit lens of the lens component.

6. The image display device according to claim 1, wherein M is 2; and
wherein a midpoint in the second direction between respective optical axes of two partial lenses included in a given unit lens located near a center in the second direction in the K unit lenses of the lens component is identical to a center position of a given unit pixel group located near a center in the second direction in the plurality of unit pixel groups in the display panel.

7. The image display device according to claim 1, wherein the lens component and display panel have respective marks for alignment in assembling thereof.

8. The image display device according to claim 1, wherein the flat part is further away from the display panel along the third direction than at least a portion of the respective M partial lenses.

9. The image display device according to claim 2, wherein at least a portion of each of the M partial lenses is closer to the display panel along the third direction than the respective flat part.

* * * * *